(12) United States Patent
Tambo et al.

(10) Patent No.: US 10,730,379 B2
(45) Date of Patent: Aug. 4, 2020

(54) VEHICLE FUEL CELL STACK FRAME AND PROTRUDING PORTIONS

(71) Applicant: TOYOTA JIDOSHA KABUSHIKI KAISHA, Toyota-shi, Aichi-ken (JP)

(72) Inventors: Tomoki Tambo, Toyota (JP); Hirofumi Kanazawa, Toyota (JP); Tadashi Akiyama, Okazaki (JP)

(73) Assignee: TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 15/953,863

(22) Filed: Apr. 16, 2018

(65) Prior Publication Data

US 2018/0297461 A1   Oct. 18, 2018

(30) Foreign Application Priority Data

Apr. 18, 2017   (JP) ................................ 2017-081706

(51) Int. Cl.
*B60L 8/00* (2006.01)
*B60K 1/04* (2019.01)
(Continued)

(52) U.S. Cl.
CPC .............. *B60K 1/04* (2013.01); *B60L 3/0007* (2013.01); *B60L 3/0053* (2013.01); *B60L 50/71* (2019.02);
(Continued)

(58) Field of Classification Search
CPC .... B60K 1/00; B60K 1/04; B60K 2001/0411;
B60L 50/00; B60L 50/71; B60L 50/72;
B60L 50/50; B60L 50/70; B60L 3/0053;
B60L 3/0007; H01M 2/1083; H01M 2/00;
H01M 2/10; H01M 2/1016; H01M
8/04059; H01M 8/2475; H01M 2250/20
See application file for complete search history.

(56) References Cited

U.S. PATENT DOCUMENTS

| | | | |
|---|---|---|---|
| 7,896,115 B2 * | 3/2011 | Ono | ......................... B60K 1/04 180/65.31 |
| 8,985,259 B2 * | 3/2015 | Ozawa | ..................... B60K 1/04 180/292 |

(Continued)

FOREIGN PATENT DOCUMENTS

| | | |
|---|---|---|
| JP | 8-192639 | 7/1996 |
| JP | 2009-190438 | 8/2009 |

(Continued)

*Primary Examiner* — James M Dolak
(74) *Attorney, Agent, or Firm* — Finnegan, Henderson, Farabow, Garrett & Dunner, LLP

(57) ABSTRACT

There is provided a fuel cell vehicle, including a high voltage system disposed in a front compartment of the vehicle, and a first protruding portion that protrudes in a left-right direction of the vehicle toward a vehicle body of the vehicle further than a portion of the high voltage system that is closest to the vehicle body, and is fixed to the high voltage system, in which, when the vehicle is placed on a horizontal plane, the first protruding portion is arranged such that a position of a first most-protruded portion of the first protruding portion that protrudes most toward the vehicle body in a height direction is located at the same position or higher than a center of gravity of the high voltage system.

7 Claims, 22 Drawing Sheets

(51) Int. Cl.
*H01M 2/10* (2006.01)
*B60L 50/72* (2019.01)
*B60L 50/71* (2019.01)
*H01M 8/2475* (2016.01)
*H01M 8/04029* (2016.01)
*B60L 3/00* (2019.01)
*H01M 8/2485* (2016.01)
*H01M 8/04007* (2016.01)
*B60L 58/33* (2019.01)
*H01M 8/1018* (2016.01)
*B60K 15/03* (2006.01)
*B60K 15/063* (2006.01)

(52) U.S. Cl.
CPC .......... *B60L 50/72* (2019.02); *H01M 2/1083* (2013.01); *H01M 8/04029* (2013.01); *H01M 8/2475* (2013.01); *H01M 8/2485* (2013.01); *B60K 2001/0411* (2013.01); *B60K 2015/03315* (2013.01); *B60K 2015/03375* (2013.01); *B60K 2015/0637* (2013.01); *B60L 58/33* (2019.02); *B60Y 2306/01* (2013.01); *B60Y 2400/102* (2013.01); *H01M 8/04059* (2013.01); *H01M 2008/1095* (2013.01); *H01M 2250/20* (2013.01); *Y02T 90/32* (2013.01)

(56) References Cited

U.S. PATENT DOCUMENTS

| | | | | |
|---|---|---|---|---|
| 9,079,508 B2* | 7/2015 | Naito | ........................ | B60K 1/04 |
| 9,260,034 B2* | 2/2016 | Naito | ..................... | B60L 3/0007 |
| 9,283,838 B2* | 3/2016 | Ohashi | ..................... | B60K 1/04 |
| 9,300,001 B2* | 3/2016 | Naito | .................. | H01M 8/2475 |
| 9,333,845 B2* | 5/2016 | Winter | ..................... | B60K 1/04 |
| 9,371,009 B2* | 6/2016 | Ishikawa | ................ | B62D 21/15 |
| 9,539,897 B2* | 1/2017 | Yoshinaga | ............... | B60K 1/04 |
| 9,895,999 B2* | 2/2018 | Ohashi | ..................... | B60L 50/71 |
| 9,902,249 B2* | 2/2018 | Nagaosa | .................. | B60K 1/04 |
| 9,937,780 B2* | 4/2018 | Murata | ..................... | B60K 1/04 |
| 9,941,495 B2* | 4/2018 | Naito | .................. | H01M 2/1083 |
| 9,950,603 B2* | 4/2018 | Abe | ........................ | B60K 5/12 |
| 9,963,171 B2* | 5/2018 | Nagaosa | ........... | H01M 8/04201 |
| 9,981,693 B2* | 5/2018 | Murata | ..................... | B60K 1/04 |
| 10,074,868 B2* | 9/2018 | Nara | .................. | H01M 8/04037 |
| 10,093,183 B2* | 10/2018 | Murata | ..................... | B60K 1/04 |
| 10,202,029 B2* | 2/2019 | Sumikawa | ............... | B60K 1/04 |
| 10,263,273 B2* | 4/2019 | Sato | .................. | H01M 8/04037 |
| 10,300,788 B2* | 5/2019 | Nishiumi | ............. | B60K 15/067 |
| 10,355,293 B2* | 7/2019 | Murata | ............. | H01M 8/04201 |
| 10,384,544 B2* | 8/2019 | Sekine | .................. | B60L 3/0007 |
| 10,454,117 B2* | 10/2019 | Yamafuji | ............. | H01M 8/247 |
| 10,454,125 B2* | 10/2019 | Naito | .................. | H01M 8/2475 |
| 10,461,353 B2* | 10/2019 | Naito | .................. | H01M 8/2483 |
| 10,461,354 B2* | 10/2019 | Naito | ..................... | B60L 58/33 |
| 10,468,705 B2* | 11/2019 | Nishiumi | ............. | H01M 8/2475 |
| 10,479,178 B2* | 11/2019 | Nagano | ..................... | B60K 1/04 |
| 10,511,045 B2* | 12/2019 | Takeyama | ........... | H01M 8/2475 |
| 10,518,620 B2* | 12/2019 | Yamafuji | ................ | B60L 50/72 |
| 10,573,917 B2* | 2/2020 | Naito | ..................... | B60L 50/71 |
| 2010/0147608 A1* | 6/2010 | Okabe | ..................... | B60K 1/04 |
| | | | | 180/65.31 |
| 2012/0080253 A1* | 4/2012 | Katano | .................... | B60K 1/00 |
| | | | | 180/68.1 |
| 2016/0121933 A1 | 5/2016 | Ohmura | | |

FOREIGN PATENT DOCUMENTS

| | | |
|---|---|---|
| JP | 2014-86171 | 5/2014 |
| JP | 2016-88264 | 5/2016 |

* cited by examiner

Fig.3
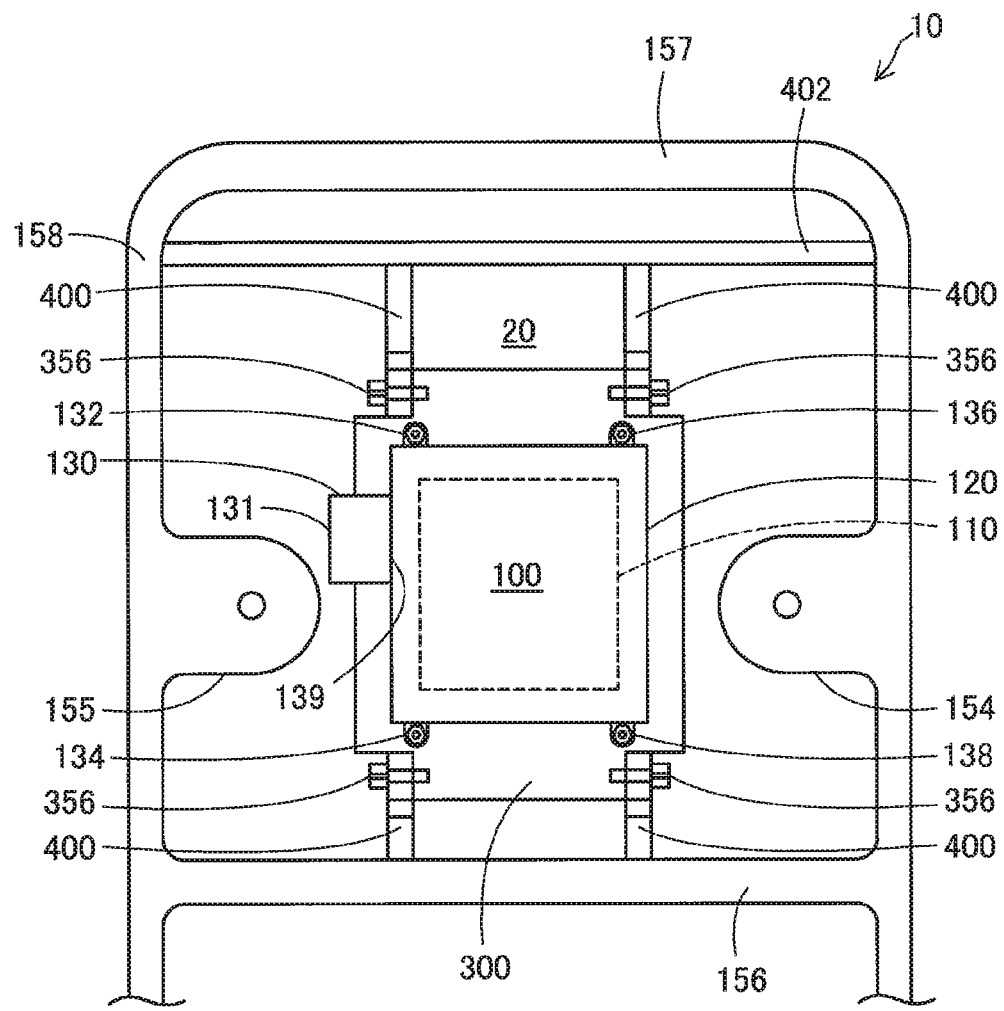
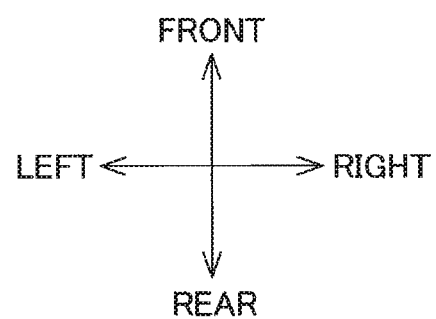

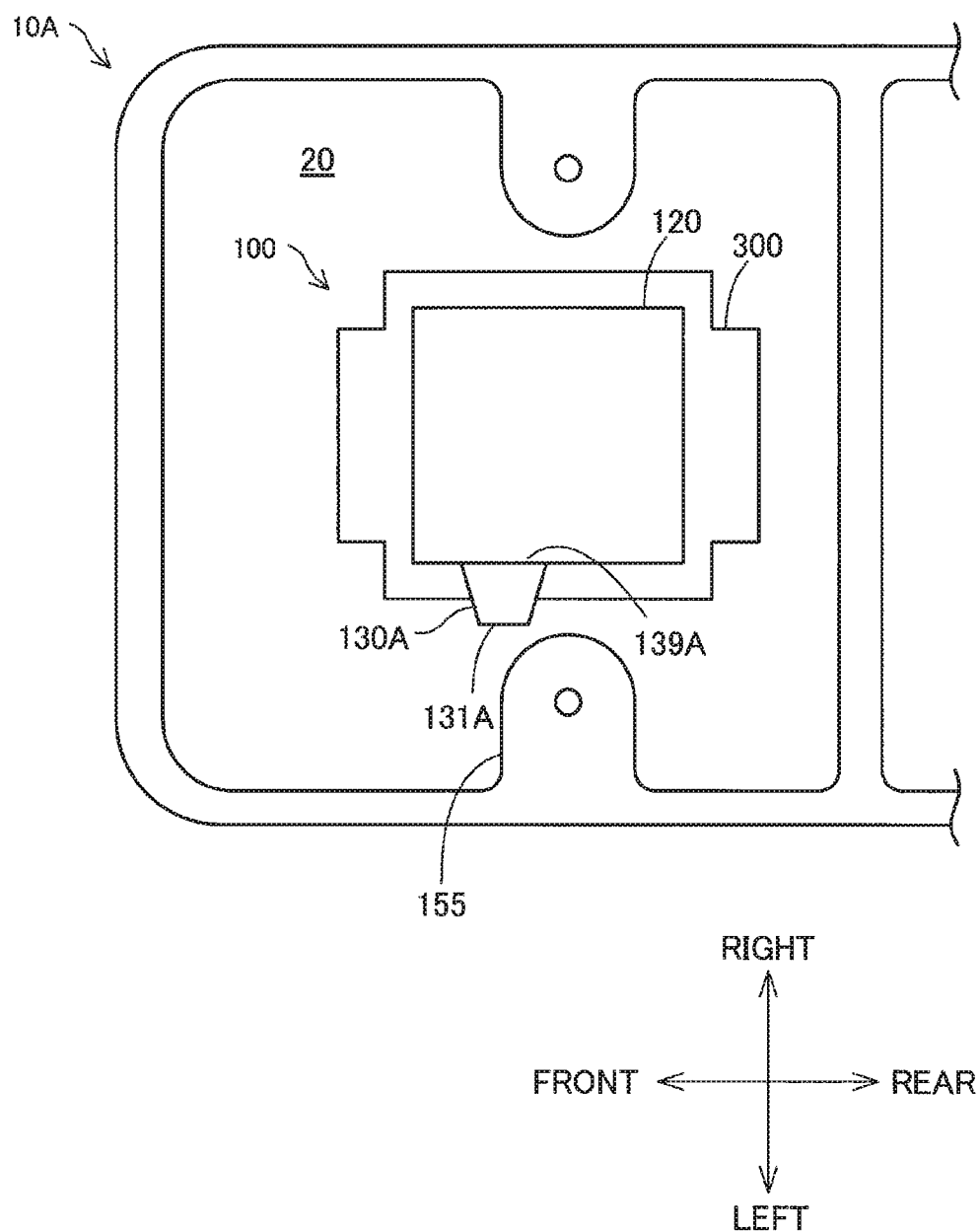

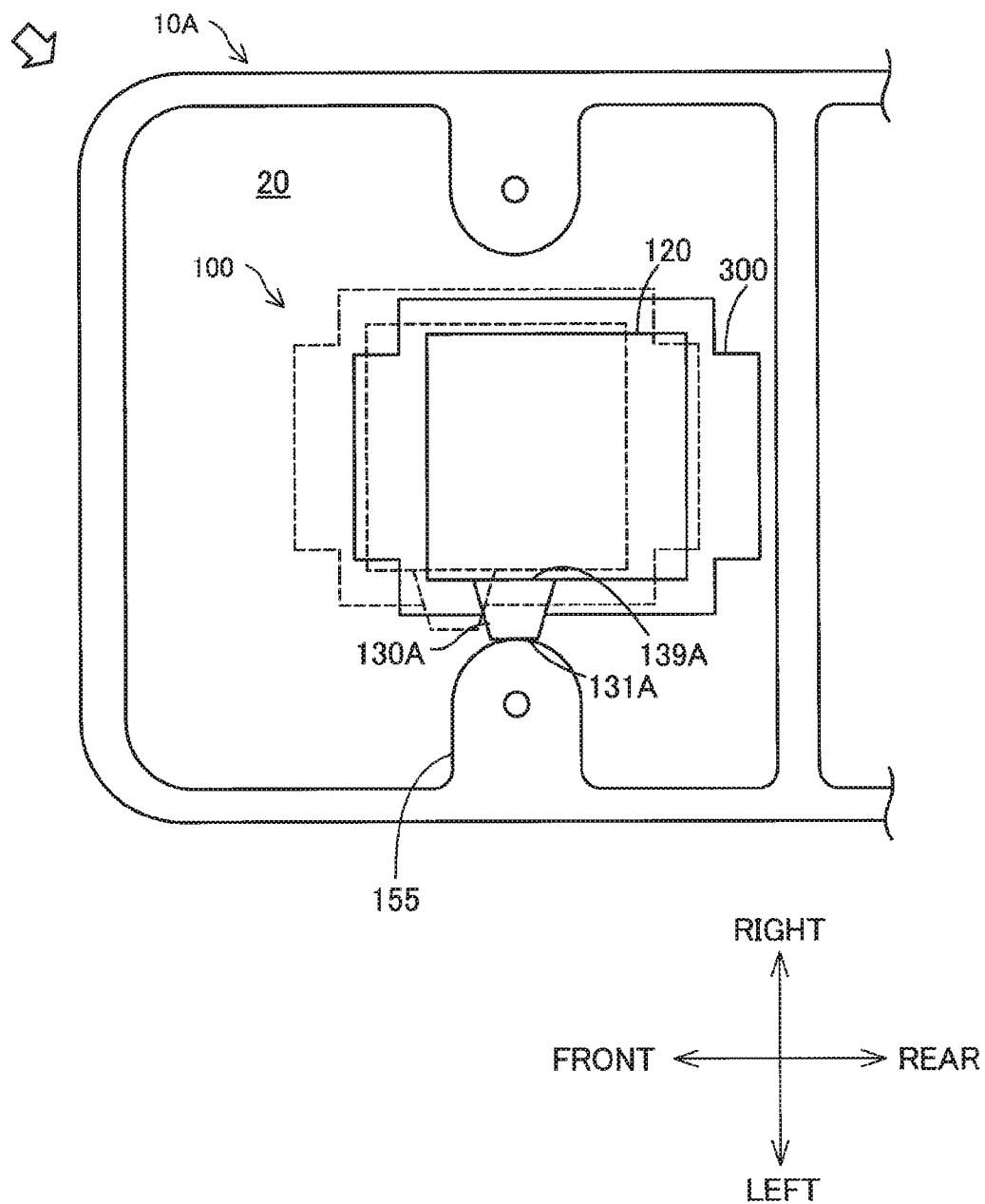

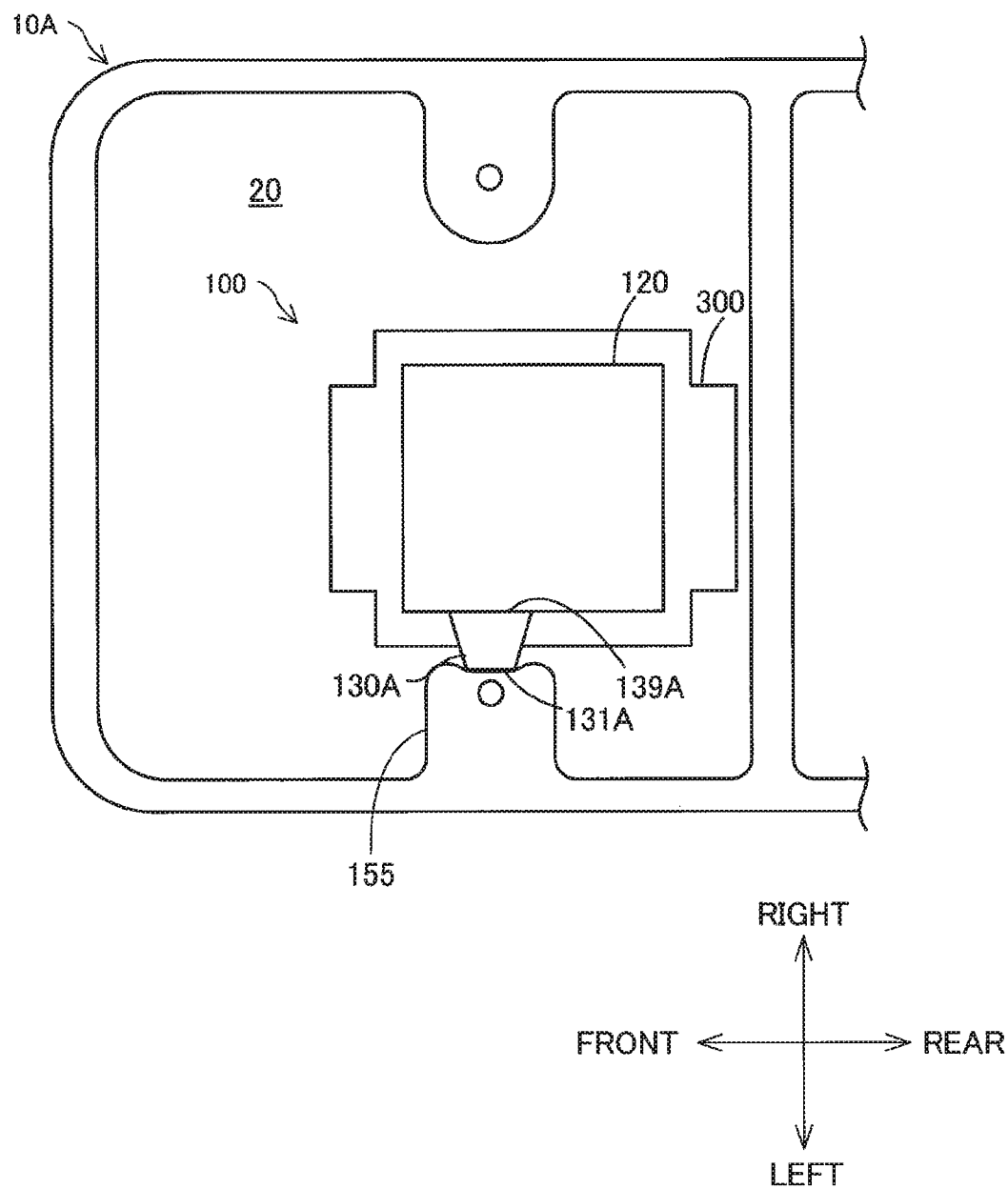

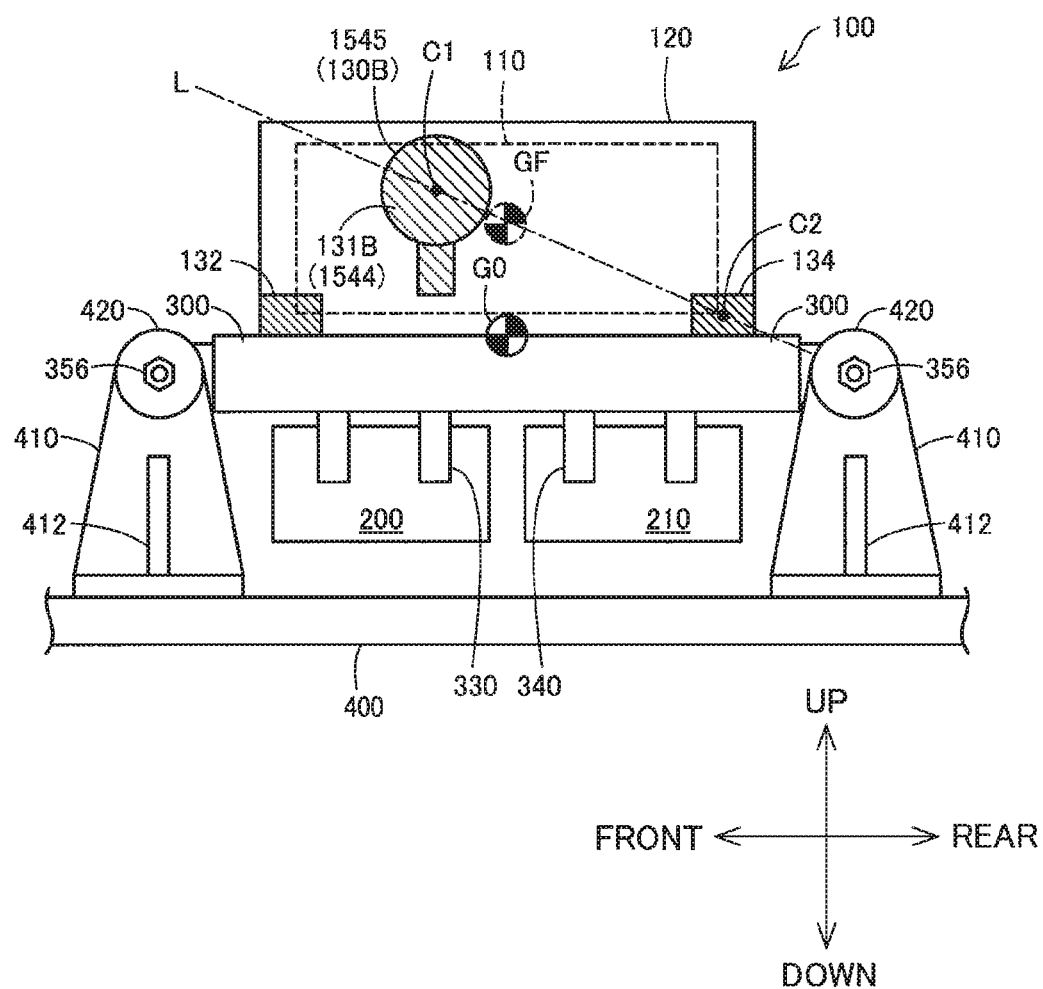

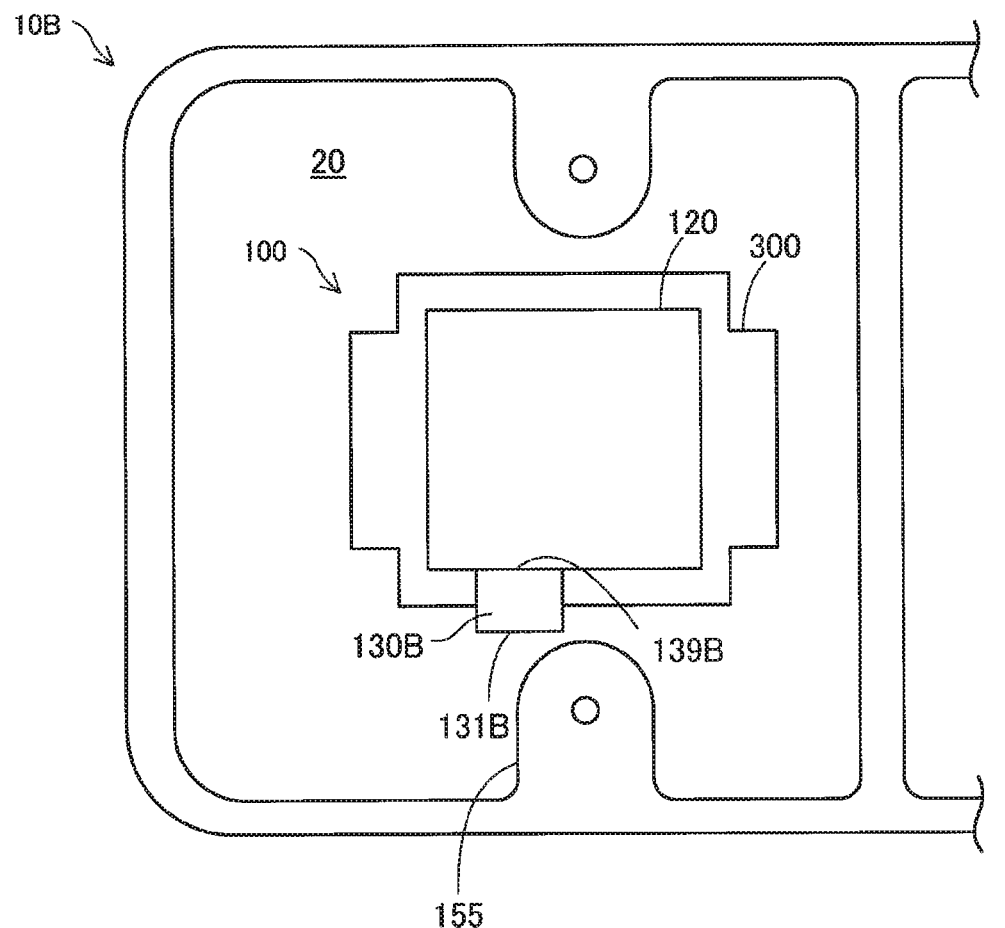

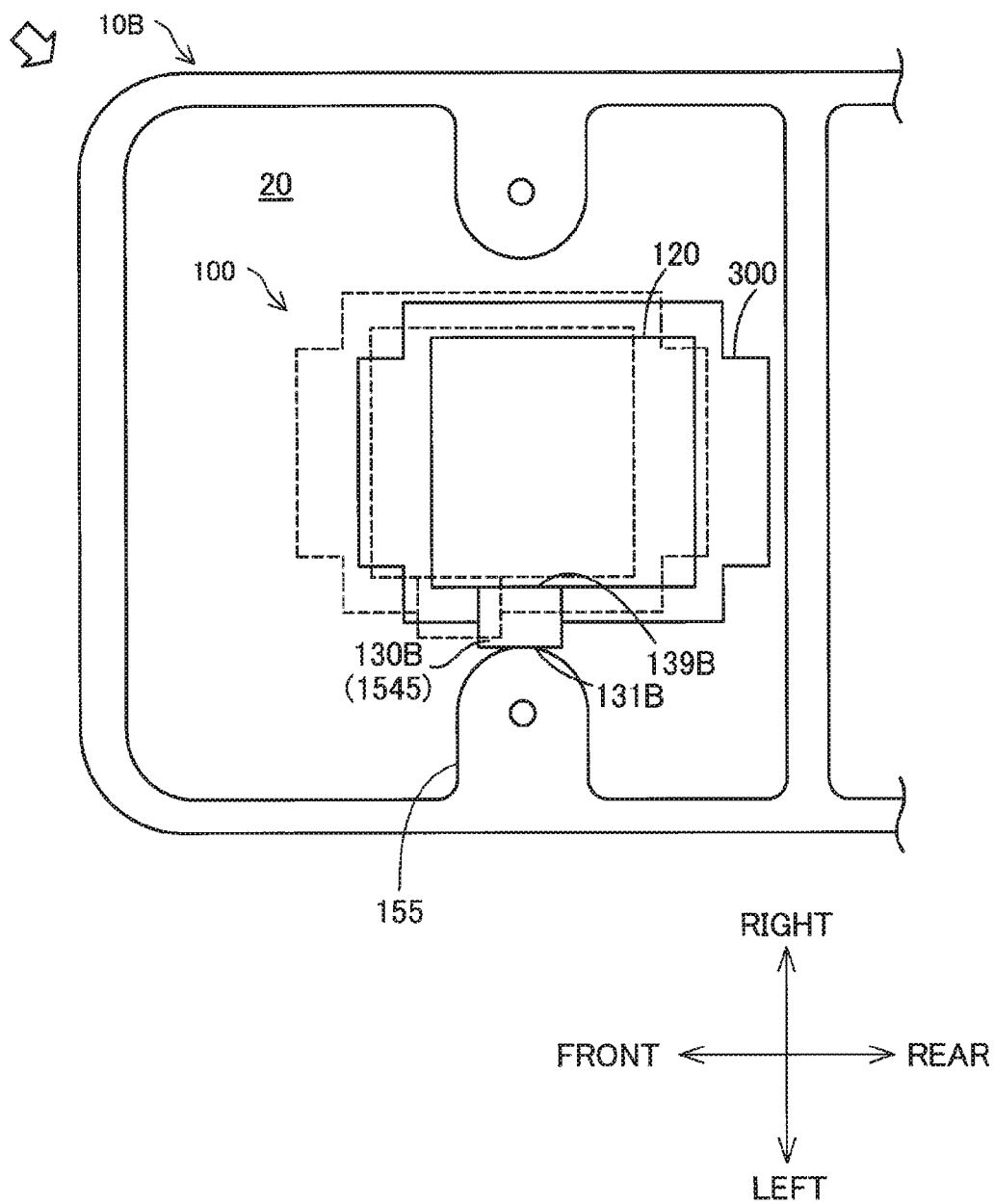

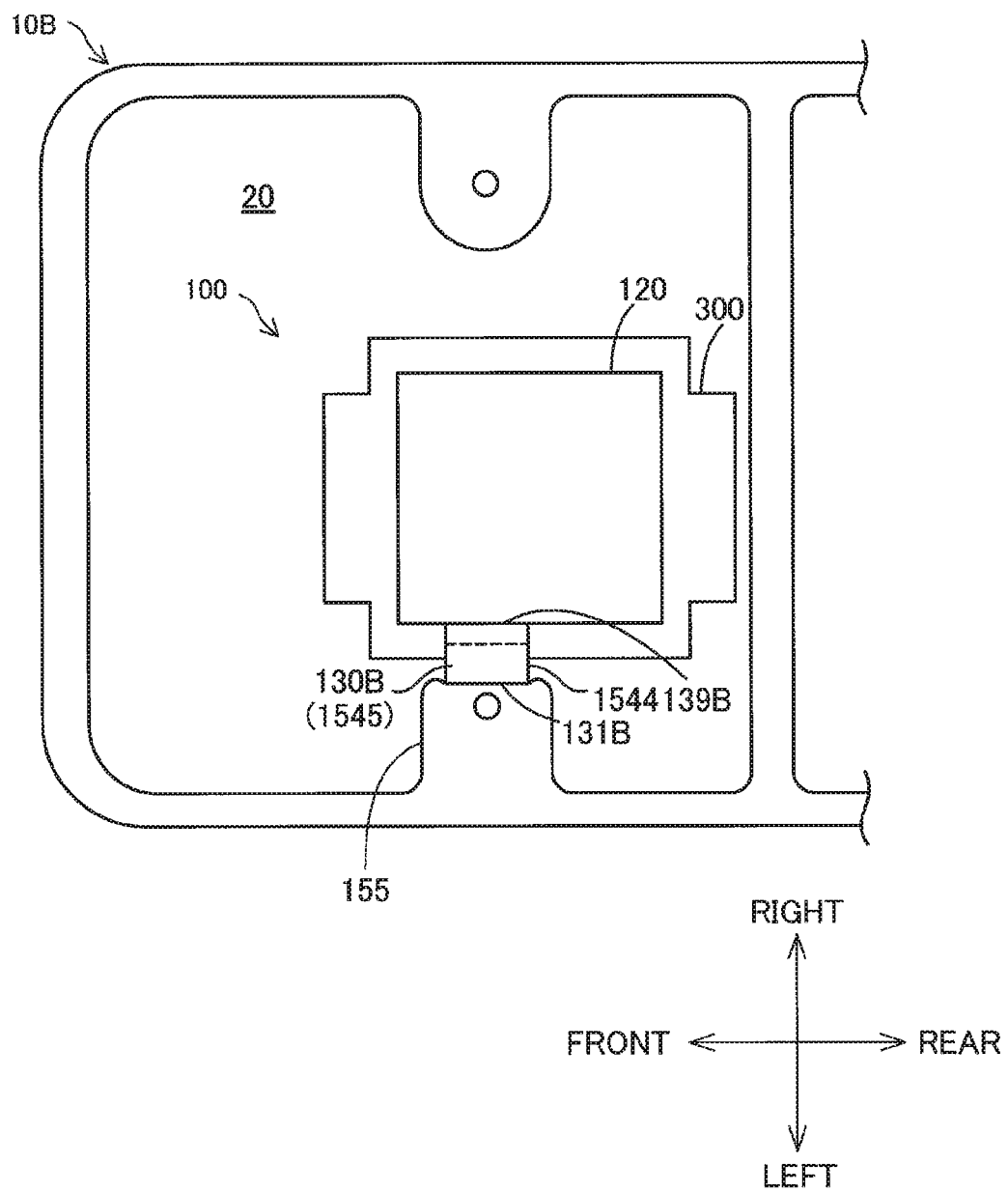

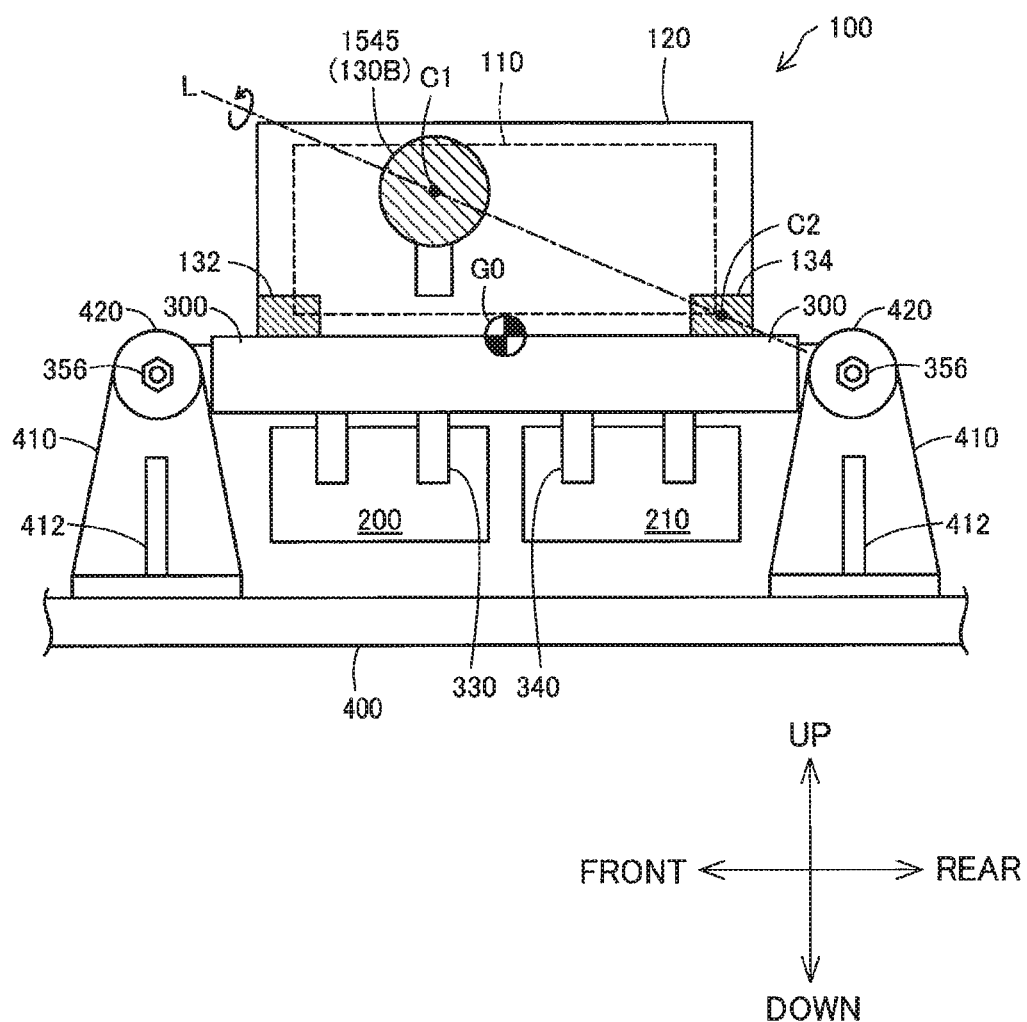

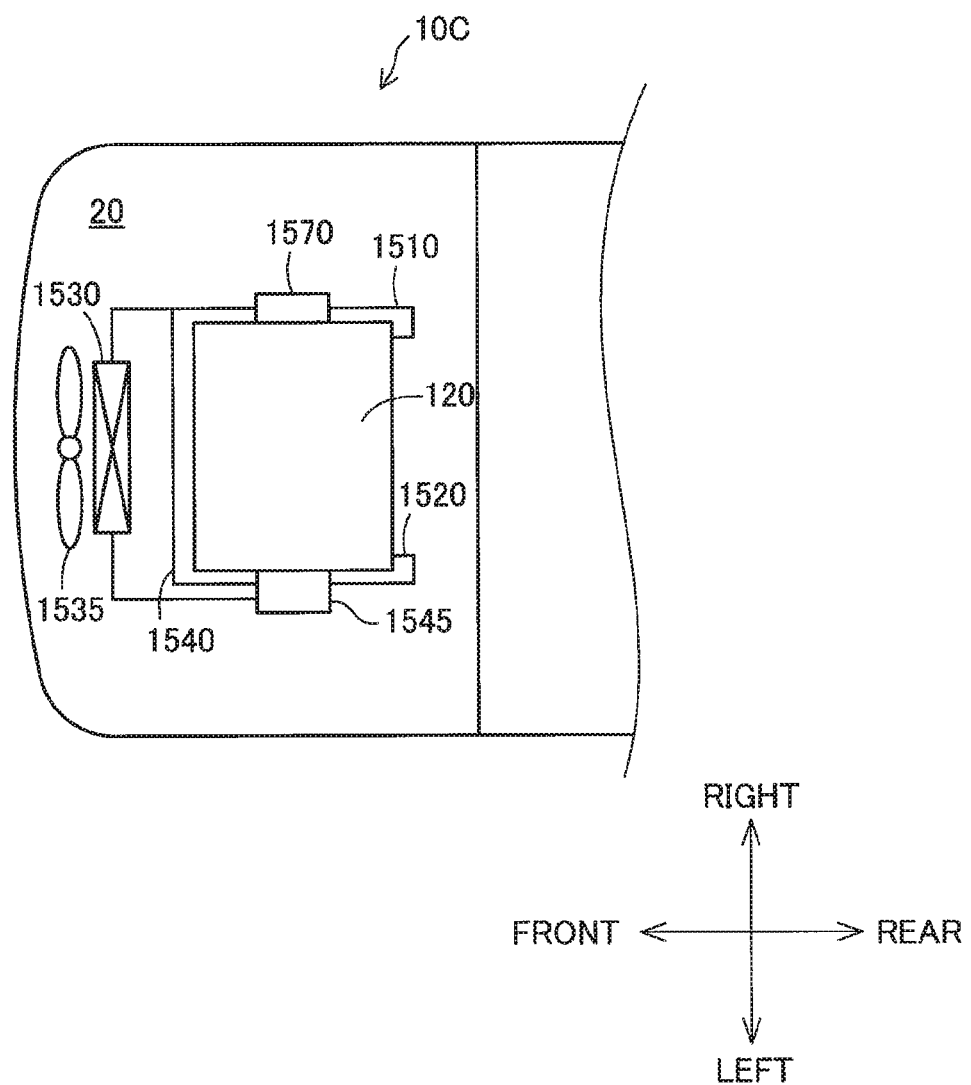

VEHICLE FUEL CELL STACK FRAME AND PROTRUDING PORTIONS

CROSS REFERENCE TO RELATED APPLICATIONS

The present application claims priority based on Japanese Patent Application No. 2017-081706 filed on Apr. 18, 2017, the disclosure of which is hereby incorporated by reference in its entirety.

BACKGROUND

Field

The present disclosure relates to a fuel cell vehicle.

Related Art

In some fuel cell vehicles, a case is used that houses a sub-assembly in which a fuel cell and a power control unit are joined to each other integrally. In Japanese Patent Application No. 2009-190438, there is proposed a configuration in which the above-mentioned case includes an expanded portion that is formed by expanding a portion of the case. In this configuration, a high voltage cable that electrically connects the fuel cell to the power control unit is routed within the expanded portion.

In a fuel cell vehicle, during a collision, when a part of a portion that connects a high voltage system, which includes a fuel cell and a high voltage cable, to a vehicle body is cut off, the high voltage system may move relative to the vehicle body. In this case, the high voltage system may become damaged. Therefore, there is a need for a technology that suppresses damage to the high voltage system when the vehicle is involved in a collision.

The technology disclosed in the present specification has been developed in order to address the above-described problem, and can be implemented as the following embodiments.

SUMMARY

According to one aspect of the technology disclosed in this specification, there is provided a vehicle. The vehicle includes a high voltage system disposed in a front compartment of the vehicle and including a fuel cell, and a first protruding portion that is fixed to the high voltage system, and protrudes toward a vehicle body of the vehicle further than a portion of the high voltage system that is closest to the vehicle body, in which, when the vehicle is placed on a horizontal plane, the first protruding portion is arranged such that a position of a first most-protruded portion of the first protruding portion is located at the same position or higher than a center of gravity of the high voltage system in a height direction. The first most-protruded portion is a portion protruding most toward the vehicle body in the first protruding portion.

BRIEF DESCRIPTION OF DRAWINGS

FIG. 3 is a plan view for schematically illustrating a high voltage system and a first protruding portion arranged in a front compartment according to a first embodiment;

FIG. 11A is an explanatory view for illustrating the inside of the front compartment as viewed from above when collision load is applied to the vehicle from the front in a diagonally right direction;

FIG. 11B is an explanatory view for illustrating the inside of the front compartment as viewed from above when collision load is applied to the vehicle from the front in a diagonally right direction;

FIG. 11C is an explanatory view for illustrating the inside of the front compartment as viewed from above when collision load is applied to the vehicle from the front in a diagonally right direction;

FIG. 14 is a side view for illustrating arrangement of the high voltage system, the rotary valve, and the bracket;

FIG. 15A is an explanatory diagram for illustrating the inside of the front compartment as viewed from above when collision load is applied to the vehicle from the front in a diagonally right direction;

FIG. 15B is an explanatory diagram for illustrating the inside of the front compartment as viewed from above when collision load is applied to the vehicle from the front in a diagonally right direction;

FIG. 15C is an explanatory diagram for illustrating the inside of the front compartment as viewed from above when collision load is applied to the vehicle from the front in a diagonally right direction;

FIG. 17 is an explanatory view for illustrating the inside of the front compartment illustrated in FIG. 15B, as seen from the side; and FIG. 18 is a plan view for schematically illustrating the inside of a front compartment of a vehicle according to a fourth embodiment.

DETAILED DESCRIPTION

First Embodiment

Figure 1:
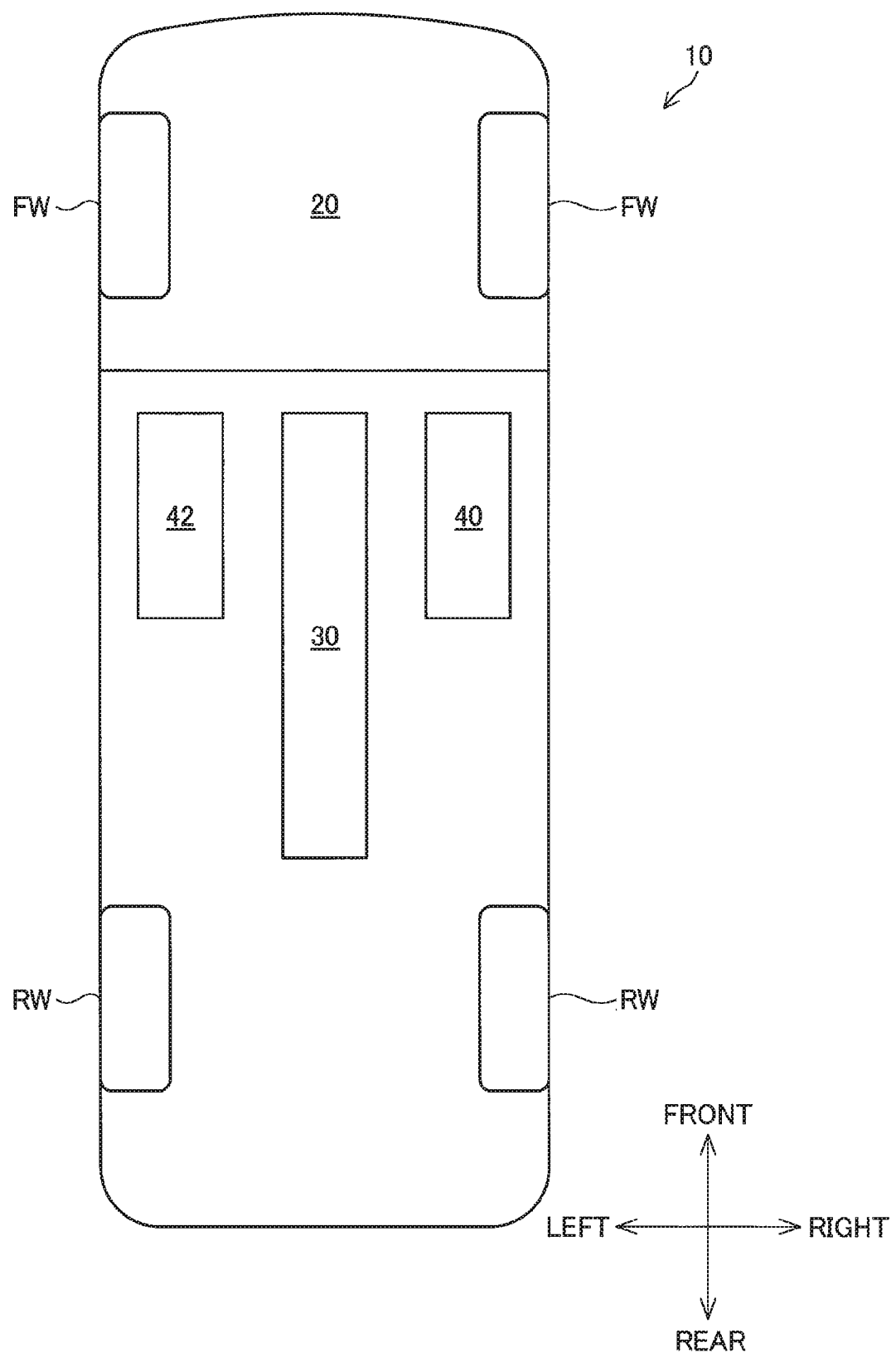
FIG. 1 is a schematic plan view for illustrating a fuel cell vehicle.

FIG. 1 is a schematic plan view for illustrating a fuel cell vehicle 10 (hereinafter referred to as "vehicle 10"). In FIG. 1, the arrows denote that a car-width direction of the vehicle 10 is a left-right direction, and a car-length direction of the vehicle 10 is a front-back direction. In FIG. 1, a forward direction of the vehicle 10 is "front," and a reverse direction of the vehicle 10 is "back," and a car-length direction of the vehicle 10 is a front-back direction. In addition, the right direction and the left direction when a person faces the front-back direction correspond to "right" and "left," respectively. The front-back direction and the left-right direction are perpendicular to each other. The vehicle 10 includes a front compartment 20 on a front portion thereof, a fuel tank housing 30 located behind the front compartment 20, a driver seat 40 to the right side of the fuel tank housing 30, and a passenger seat 42 to the left side of the fuel tank housing 30. The front compartment 20 is a compartment that is located at the front of the vehicle 10, and is configured as a space that includes a region sandwiched by a pair of front wheels FW. The front compartment 20 stores such as a fuel stack (to be described later), an accessory (to be described later) that is used to operate the fuel cell stack, and a drive motor. The fuel tank housing 30 is a space in which the fuel tank is housed, and, in this embodiment, is provided with a so-called center tunnel between the driver seat 40 and the passenger seat 42. In this embodiment, a right-hand drive vehicle is used as an example. Should this disclosure be applied to a left-hand drive vehicle, the positions of the driver seat 40 and the passenger seat 42 should be reversed. A motor, which is a power source, of the vehicle 10 is driven by electrical power that is supplied from the fuel cell stack, to thereby drive the front wheels FW.

Figure 2:
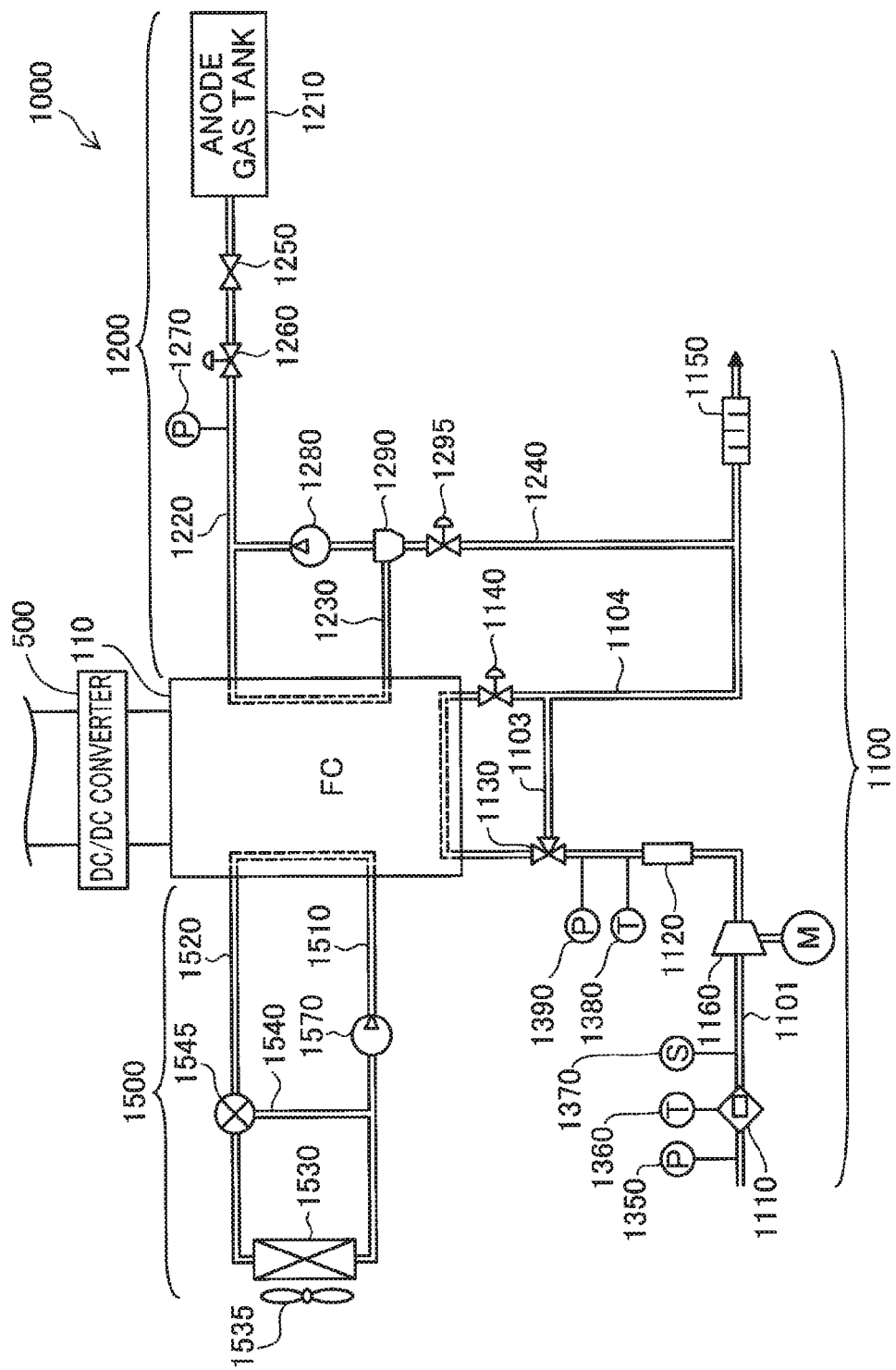
FIG. 2 is an explanatory view for schematically illustrating a fuel cell system that is installed in a vehicle.

FIG. 2 is an explanatory view for schematically illustrating a fuel cell system 1000 that is installed in the vehicle 10. The fuel cell system 1000 includes a fuel cell stack 110, an FC cooling system 1500, an anode gas supply system 1200, and a cathode gas supply/discharge system 1100.

The fuel cell stack 110 has a stacked structure that includes a plurality of single cells (not shown) as power generators stacked on top of one another. In this embodiment, the fuel cell stack 110 is a solid polymer fuel cell, but another type of fuel cell may be used. Output voltage of the fuel cell stack 110 varies due to performance of each of the single cells, the number of single cells to be stacked, and operating conditions (for example, temperature and humidity) of the fuel cell stack 110. In this embodiment, the output voltage of the fuel cell stack 110 when the fuel cell stack 110 is made to generate power at an operation point at which power generating efficiency is highest is approximately 240 V.

The FC cooling system 1500 includes a refrigerant supply pipe 1510, a refrigerant discharge pipe 1520, a radiator 1530, a bypass pipe 1540, a rotary valve 1545, and a refrigerant pump 1570. The refrigerant is, for example, antifreeze such as water or ethylene glycol, or air. The refrigerant pump 1570 is provided with the refrigerant supply pipe 1510, and is configured to supply refrigerant to the fuel cell stack 110. The rotary valve 1545 is a valve for controlling the amount of refrigerant that flows to the radiator 1530 and the bypass pipe 1540. The radiator 1530 is provided with a radiator fan 1535.

The anode gas supply system 1200 includes an anode gas tank 1210, an anode gas supply pipe 1220, an anode gas circulation pipe 1230, a main stop valve 1250, a pressure control valve 1260, a supplied gas pressure sensor 1270, an anode gas pump 1280, an air/liquid separator 1290, an air/water exhaust valve 1295, and an air/water exhaust pipe 1240. The anode gas tank 1210 stores, for example, high-pressure hydrogen gas. The anode gas tank 1210 is connected to the fuel cell stack 110 via the anode gas supply pipe 1220. The anode gas supply system 1200 supplies the anode gas that is stored in the anode gas tank 1210 to the fuel cell stack 110, and circulates anode exhaust gas that is exhausted from the fuel cell stack 110 to the anode gas supply pipe 1220. In addition, impurity gas, such as nitrogen gas, that is included in the anode exhaust gas is separated together with liquid water by the air/liquid separator 1290, and then expelled outside the system after passing through the air/water exhaust valve 1295 and the air/water exhaust pipe 1240.

The cathode gas supply/discharge system 1100 includes a cathode gas supply pipe 1101, a bypass pipe 1103, a cathode gas discharge pipe 1104, an air cleaner 1110, an intercooler 1120, a flow dividing valve 1130, a pressure control valve 1140, a silencer 1150, and an air compressor 1160. The cathode gas supply pipe 1101 is provided with the air cleaner 1110, an atmospheric pressure sensor 1350, an outside temperature sensor 1360, an air flow meter 1370, the air compressor 1160, the intercooler 1120, the flow dividing valve 1130, a supplied gas temperature sensor 1380, and a supplied gas pressure sensor 1390. The cathode gas supply/discharge system 1100 incorporates air (cathode gas) into the system through the air compressor 1160, supplies the air to the fuel cell stack 110, and then discharges unused air (cathode exhaust gas) from the system. The silencer 1150 reduces the noise of discharging the cathode exhaust gas. A downstream portion of the air/water exhaust pipe 1240 in the anode gas supply system 1200 is connected to the cathode gas exhaust pipe 1104.

A DC/DC converter 500 is connected to the fuel cell stack 110. The DC/DC converter 500 is configured to increase the output voltage of the fuel cell stack 110 to a high voltage that can be used by an inverter (not shown) that is connected to a drive motor (not shown) that drives the wheels of the vehicle 10.

Figure 4:
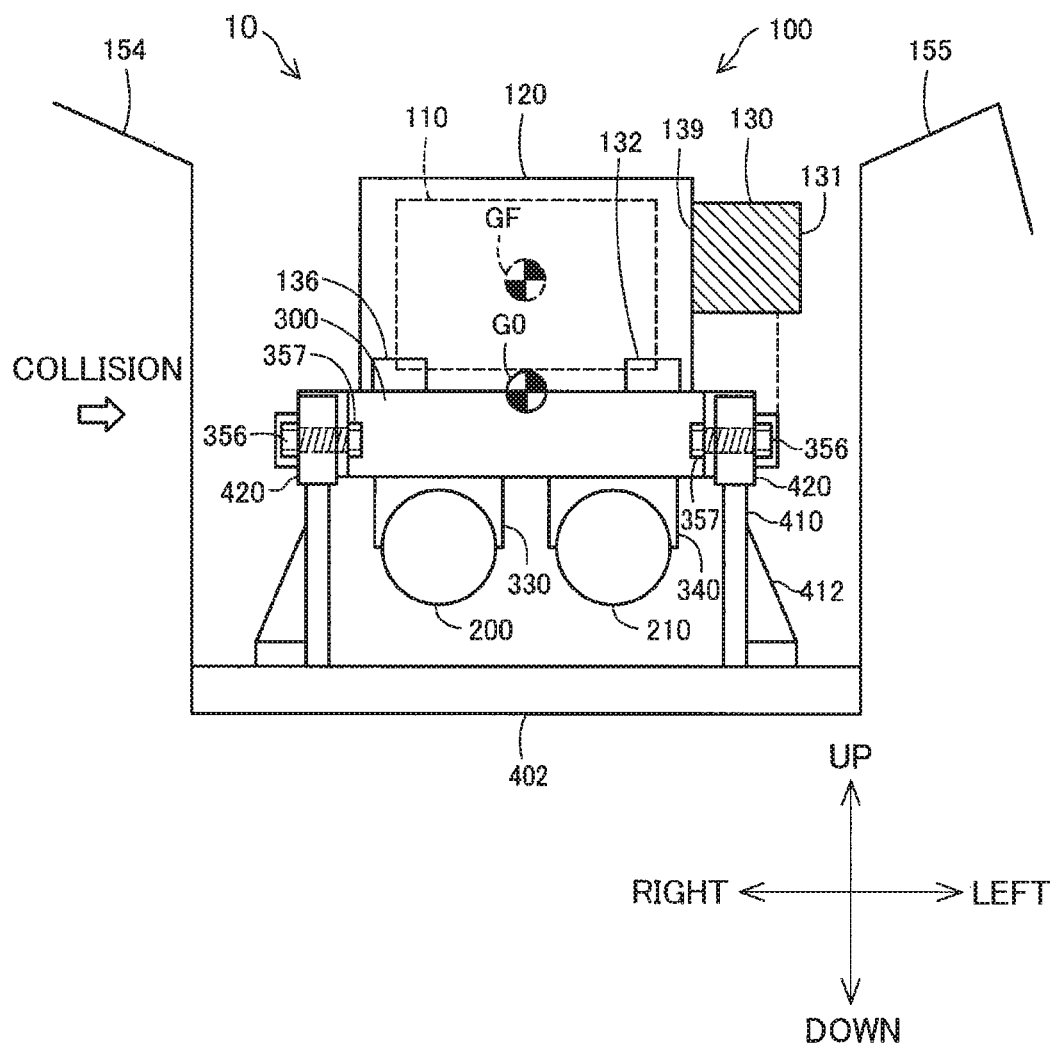
FIG. 4 is a front view for schematically illustrating the high voltage system and the first protruding portion.
Figure 5:
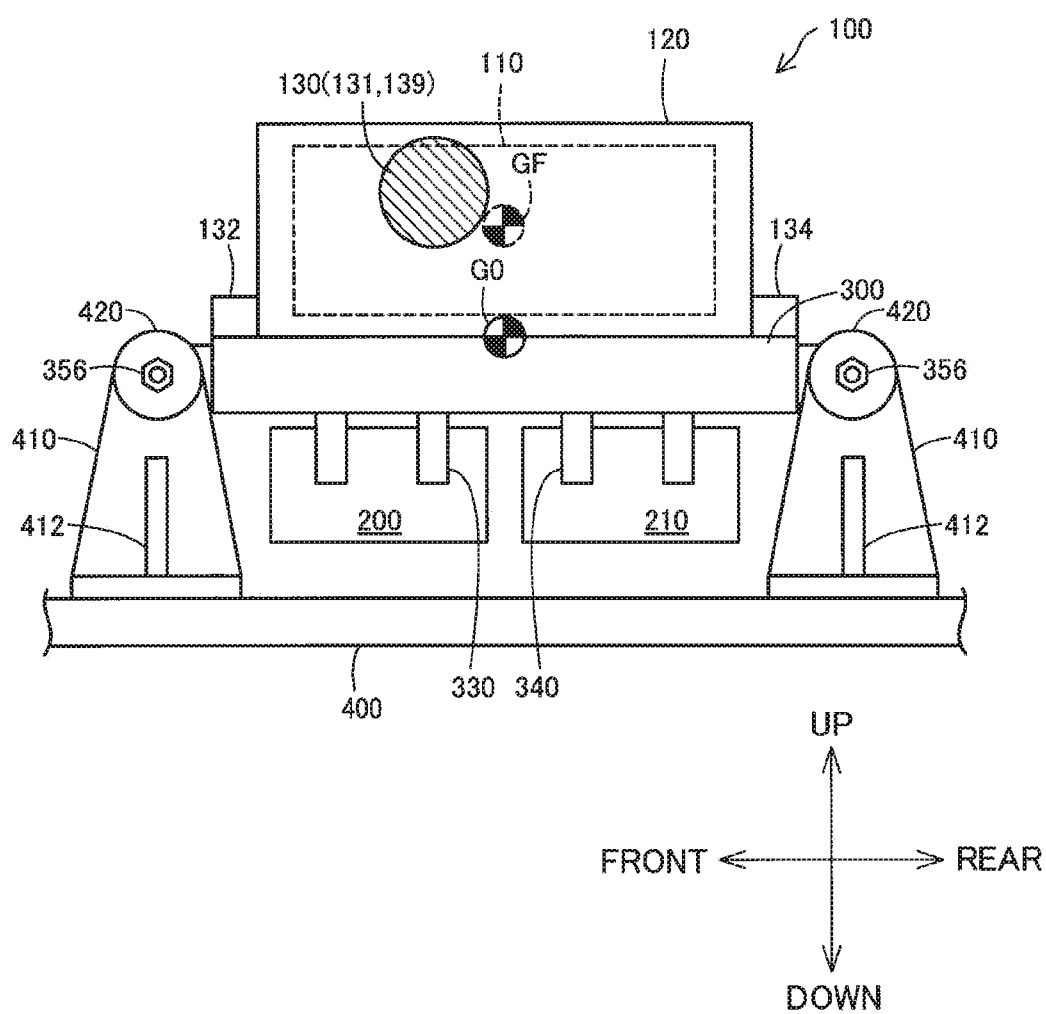
FIG. 5 is a side view for schematically illustrating the high voltage system and the first protruding portion.

FIG. 3 is a plan view for schematically illustrating a high voltage system 100 and a first protruding portion 130 arranged in the front compartment 20 according to a first embodiment. FIG. 4 is a front view for schematically illustrating the high voltage system 100 and the first protruding portion 130. FIG. 5 is a side view for schematically illustrating the high voltage system 100 and the first protruding portion 130.

As illustrated in FIG. 3, a front bumper 157 is provided on the front of the front compartment 20 as one part of a body 158. The front compartment 20 is separated from the vehicle interior at the rear of the front compartment 20 by a dash panel 156. Further, the vehicle is provided with two suspension members 400 that extends in the front-rear direction of the vehicle 10, and a suspension member 402 that extends in the width direction of the vehicle 10. The suspension members 400 and 402 are connected to the body 158. In addition, the front compartment 20 is provided with a pair of suspension towers 154 and 155 that protrude inward toward the front compartment 20. The pair of suspension towers 154 and 155 is arranged below the vehicle body, and are formed so as to cover a front suspension that is configured to support the front wheels FW (FIG. 1) of the vehicle 10. The suspension towers 154 and 155 support an upper end portion of the front suspension.

The high voltage system 100 is disposed in the front compartment 20. The high voltage system 100 includes the fuel cell stack 110, a stack case 120, a stack frame 300, and accessories 200 and 210 (see FIGS. 4 and 5) for the fuel cell stack 110. In this specification, the high voltage system 100 is a system that includes a high voltage component, and is configured of devices and components that move integrally with the fuel cell stack 110 when collision load is input to the vehicle 10, as described later. The fuel cell stack 110 is also simply referred to as "fuel cell."

The vehicle 10 includes a plurality of the high voltage components. The high voltage system 100 according to this embodiment includes the fuel cell stack 110 as one of the plurality of high voltage components. In this specification, the term "high voltage component" is used in accordance with safety standards (UNECE R100) enacted by the UNECE World Forum for Harmonization of Vehicle Regulations (UN/ECE/WP29). In this specification, "high voltage component" means a component having either an input voltage or an output voltage that is ≥60 V DC or ≥30 V AC. The high voltage component may also be a component having either an input voltage or an output voltage that is ≤1500 V DC or ≤1000 V AC. In this embodiment, as described above, the output voltage of the fuel cell stack 110 is approximately 240 V DC when the fuel cell stack 110 is made to generate power at an operation point at which power generating efficiency is highest, and therefore the fuel cell stack 110 can be classified as a high voltage component.

In the high voltage system 100, the fuel cell stack 110 is arranged such that a position of center of gravity GF (FIG. 4) of the fuel cell stack 110 in the height direction (up/down direction) is higher than a center of gravity G0 of the high voltage system 100.

The stack case 120 is a casing that houses the fuel cell stack 110. The stack case 120 is made of aluminum or an aluminum alloy, and achieves both light-weight and strength. The stack case 120 may be made of another type of metal, such as stainless steel, or may be made of a resin, such as a carbon fiber reinforced resin.

The stack frame 300 is a component that is substantially shaped like a flat plate to facilitate mounting the fuel cell stack 110 to the vehicle body of the vehicle 10. Here, "substantially shaped like a flat plate" includes a shape that is a flat plate overall, but has an uneven surface. The stack frame 300 is made of a carbon fiber reinforced resin, and achieves both light-weight and strength. The stack frame 300 may be made of another type of resin, or may be made of a metal such as aluminum, an aluminum alloy, or stainless steel.

The fuel cell stack 110 is placed on the stack frame 300 in a state in which the fuel cell stack 110 is housed by the stack case 120. The stack case 120 is fixed to the stack frame 300 by brackets 132, 136, 134, and 138 (see FIGS. 3 to 5). In this embodiment, the brackets 132, 136, 134, and 138 protrude toward the stack case 120 in the front-back direction of the vehicle 10. The brackets 132, 136, 134, and 138 are made of the same material as the stack case 120 to be formed integrally with the stack case 120.

The stack frame 300 is supported by the suspension members 400 of the vehicle 10 (see FIGS. 3 and 5). As a result, the fuel cell stack 110 is mounted to the vehicle body of the vehicle 10. As illustrated in FIG. 5, rubber made mounting brackets 410 configured to support the stack frame 300 are provided to the suspension member 400 as substantially plate-shaped members that extend directly upward. Mounts 420 are provided on top portions of the mounting brackets 410. The stack frame 300 is fastened to the mounts 420 with bolts 356 and nuts 357. A mounting bracket strengthening plate 412 that supports a vertically standing portion of the mounting bracket 410 from the left-right direction is provided on a side surface of the mounting bracket 410. The surface of the mounting bracket 410 and the surface of the mounting bracket strengthening plate 412 are substantially perpendicular to each other.

The accessories 200 and 210 (see FIGS. 4 and 5) include such as an anode gas pump 1280 for supplying anode gas to the fuel cell stack 110, and a refrigerant pump 1570 for supplying coolant to the fuel cell stack 110 (see FIG. 2). The accessories 200 and 210 hang down from the stack frame 300 held by hanging brackets 330 and 340, respectively. With this configuration, when the vehicle 10 is placed on a horizontal plane, the accessories 200 and 210 are positioned below the fuel cell stack 110.

As illustrated in FIGS. 3 and 4, the fuel cell stack 110 and the stack case 120 are positioned inside an outer edge of the stack frame 300 when viewed from above. In addition, the accessories 200 and 210 are also positioned inside the outer edge of the stack frame 300 when viewed from above. Specifically, the outer edge of the stack frame 300 is at a position of the high voltage system 100 that is closest to the vehicle body in the left-right direction of the vehicle 10.

The first protruding portion 130, which is fixed to a left side surface of the stack case 120 and protrudes toward the vehicle body of the vehicle 10 from that side surface, is provided in the front compartment 20. In other words, the first protruding portion 130 is fixed to the high voltage system 100, and protrudes out in the left-right direction of the vehicle 10. The first protruding portion 130 is formed into a substantially cylindrical shape, and has a first surface 139, which is one of two surfaces on both ends of the first protruding portion 130, that is joined to the left side surface of the stack case 120. The first protruding portion 130 is made of the same material as the stack case 120 (aluminum or an aluminum alloy). The first protruding portion 130 and the stack case 120 may not be made of the same material. For example, the first protruding portion 130 may be made of another metal such as stainless steel, or may be made of a resin, such as a carbon fiber reinforced resin. In this embodiment, a second surface 131, which is the other surface of the two surfaces on the both ends of the first protruding portion 130, is arranged at a position closer to the vehicle body of the vehicle 10 than the stack frame 300 of the high voltage system 100 (see FIGS. 3 and 4). As described above, among the devices and components included in the high voltage system 100, the stack frame 300 is the portion that is closest to the vehicle body in the left-right direction of the vehicle 10. Specifically, the first protruding portion 130 protrudes further than the portion of the high voltage system 100 that is closest to the vehicle body in the left-right direction of the vehicle 10. In addition, the first protruding portion 130 is arranged at a position that is higher than the height of the center of gravity G0 (see FIGS. 4 and 5) of the high voltage system 100. The first protruding portion 130 according to this embodiment is formed into a substantially cylindrical shape, and the entirety of the first protruding portion 130 can be classified as the "part that protrudes most toward the vehicle body in the first protruding portion." Therefore, the first protruding portion 130 is also referred to as the "first most protruding portion." In this specification, the "first protruding portion 130 is arranged a position that is higher than the height of the center of gravity G0 of the high voltage system 100" means that the position of the entire first most protruding portion in the height direction is higher than the height of the center of gravity G0. In other words, in terms of the height direction, the position of the lowest point of the first most protruding portion in the vertical direction is higher than the position of the center of gravity G0.

Figure 6:
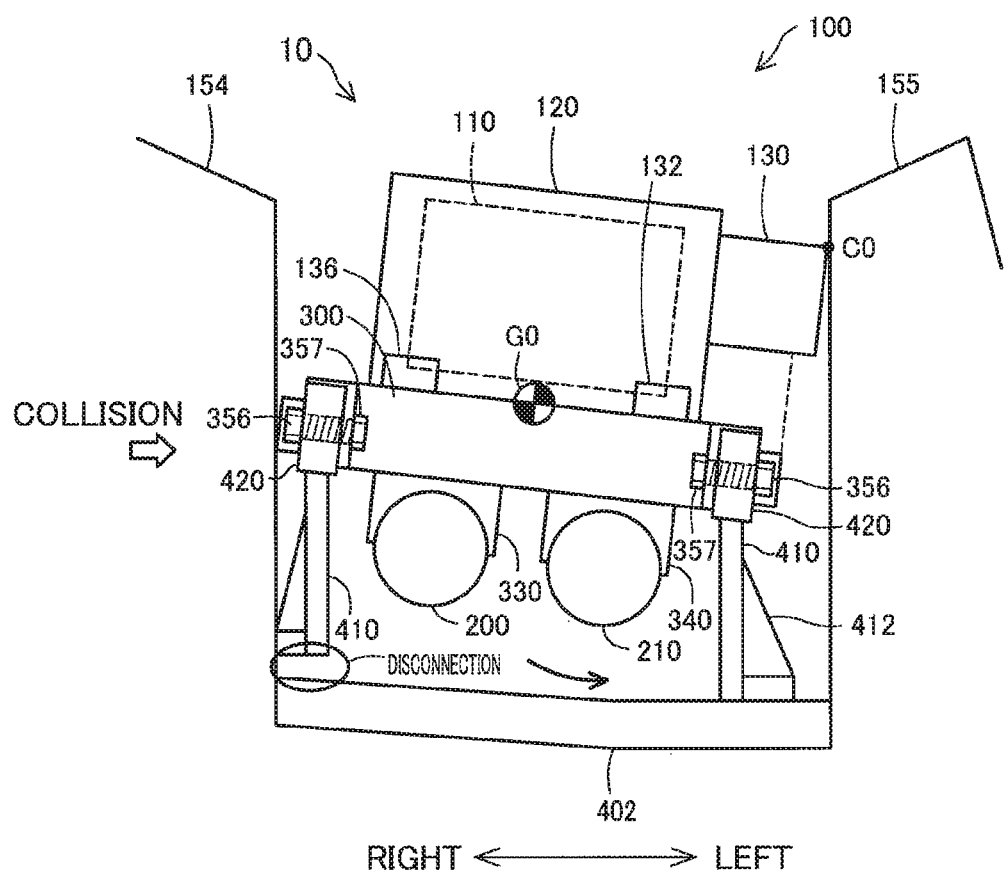
FIG. 6 is an explanatory view for conceptually explaining how the high voltage system operates when collision load is applied to the vehicle from the right.

FIG. 6 is an explanatory view for conceptually explaining how the high voltage system 100 operates when collision load is applied to the vehicle 10. When collision load is applied to the vehicle 10 from the right (includes a diagonal right direction) due to the vehicle being involved in a collision, for example, the suspension member 402 (see FIG. 3) bends, the right mounting bracket 410 becomes disconnected, and the high voltage system 100 moves so as to approach a vehicle body component, e.g., the suspension tower 155 on the left. Because the first protruding portion 130 protrudes more toward the suspension tower 155 than the stack frame 300 of the high voltage system 100, the first protruding portion 130 first makes contact with the suspension tower 155. In this embodiment, because the first protruding portion 130 is arranged at a position higher than the center of gravity G0 of the high voltage system 100, a lower portion (the side on which the accessories 200 and 210 are disposed) of the high voltage system 100 rotates in a direction (the rotation direction indicated by the curved arrow in the lower half of FIG. 6) that approaches the suspension tower 155, with the portion of the first protruding portion 130 that makes contact with the suspension tower 155 as a rotation center C0. As a result, an upper portion of the high voltage system 100 in which the fuel cell stack 110 is arranged does not make contact with vehicle body components (for example, the suspension tower 155) of the vehicle 10, and hence damage to the fuel cell stack 110 (specifically, the upper portion of the high voltage system 100) is suppressed. In addition, as illustrated in FIGS. 4 and 5, the place in the high voltage system 100 in which the accessories 200 and 210 are arranged is relatively roomy. Therefore, when the high voltage system 100 rotates about the rotation center C0, damage to the accessory 200 is suppressed. For example, even when the accessory 210 collides with the suspension tower 155 and becomes damaged, the accessory 200 is not damaged.

Second Embodiment

Figure 7:
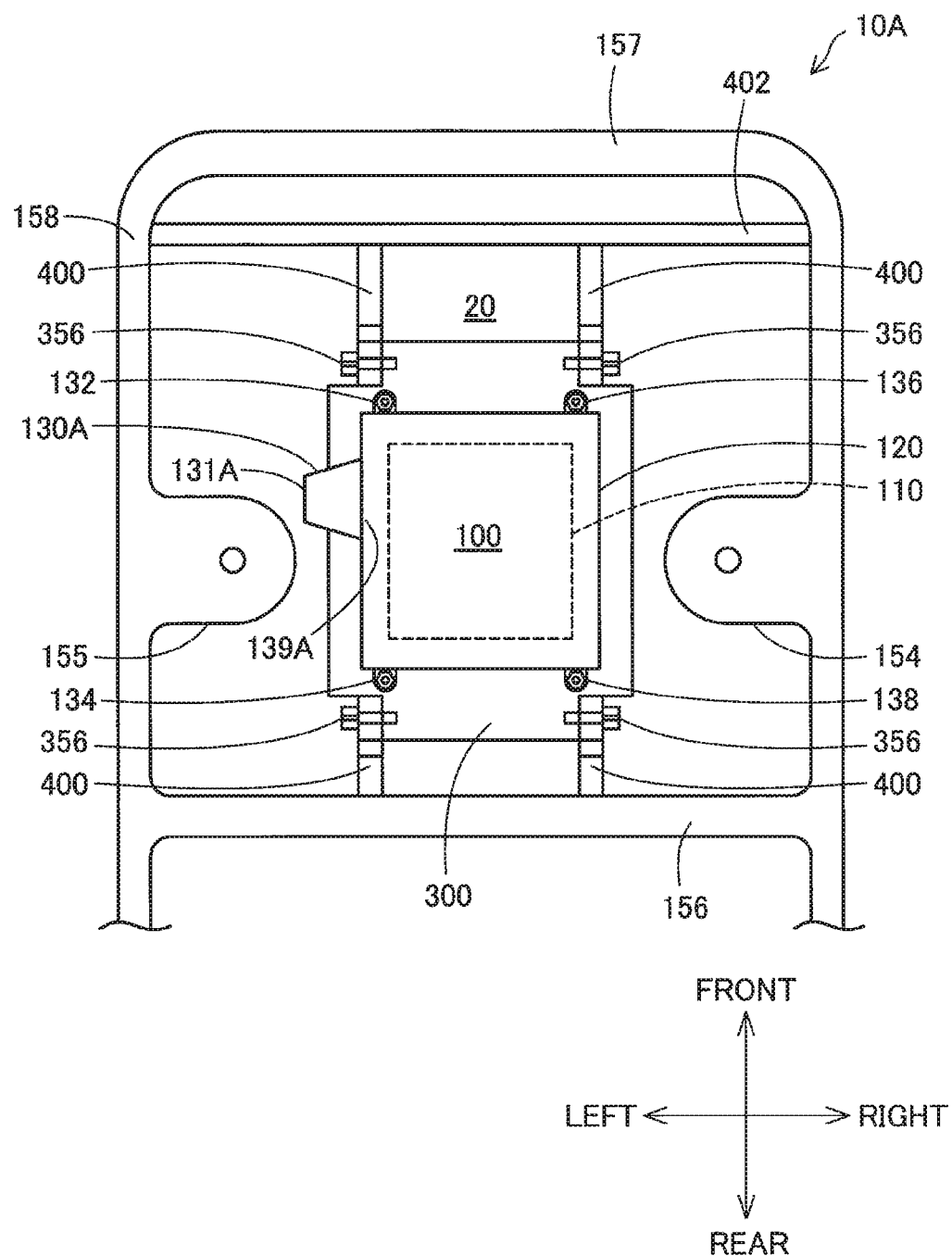
FIG. 7 is a plan view for schematically illustrating the high voltage system and the first protruding portion arranged in a front compartment according to a second embodiment.
Figure 8:
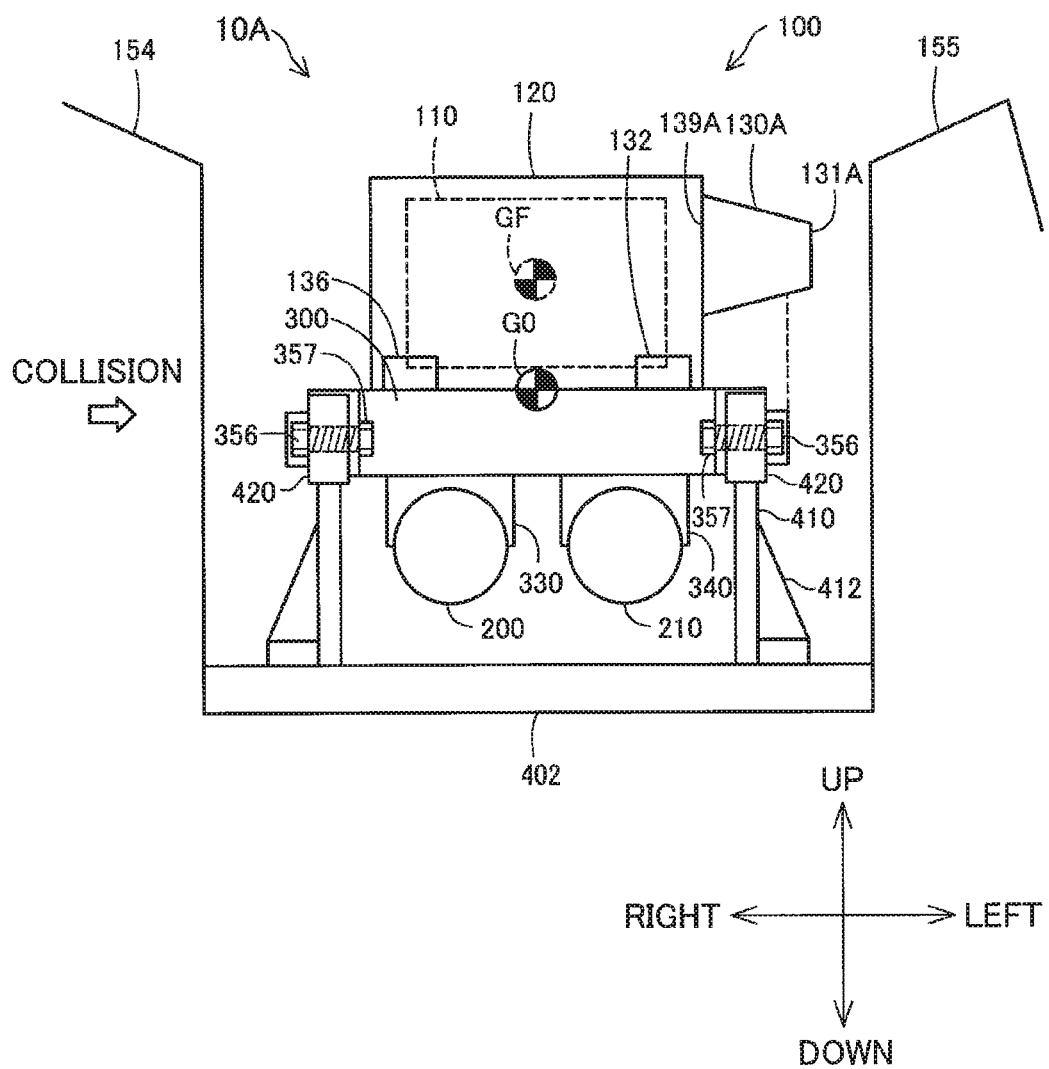
FIG. 8 is a front view for schematically illustrating the high voltage system and the first protruding portion.
Figure 9:
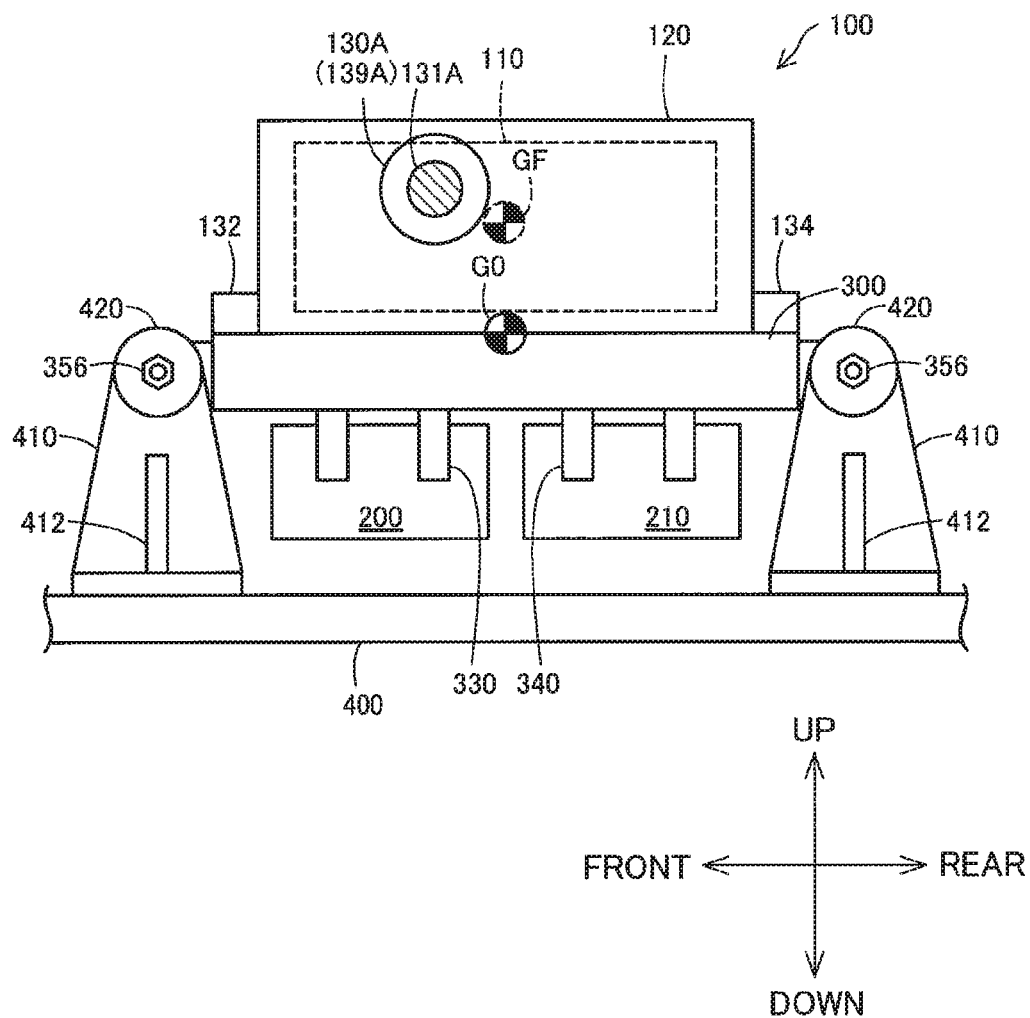
FIG. 9 is a side view for schematically illustrating the high voltage system and the first protruding portion.

FIG. 7 is a plan view for schematically illustrating the high voltage system 100 and a first protruding portion 130A arranged in the front compartment 20 according to a second embodiment. FIG. 8 is a front view for schematically illustrating the high voltage system 100 and a first protruding portion 130A. FIG. 9 is a side view for schematically illustrating the high voltage system 100 and the first protruding portion 130A. A vehicle 10A according to this embodiment is the same as the vehicle 10 according to the first embodiment except that the shape of the first protruding portion 130A is a substantially conical shape. Other configurations of the vehicle 10A are the same as those of the first embodiment. Therefore, like configurations are denoted by like reference symbols, and descriptions of those configurations are omitted. In FIG. 9, a second surface 131A of the first protruding portion 130A is indicated by diagonal hatching.

The first protruding portion 130A is formed into a substantially conical shape, and includes a first surface 139A, which is a cylindrical base surface, and the second surface 131A, which is a cylindrical top surface. Here, "substantially conical shape" is a concept that includes tolerance and measurement errors. The first surface 139A of the first protruding portion 130A is joined to the left side surface of the stack case 120 (see FIG. 8). Specifically, the second surface 131A is a tip of the first protruding portion 130A in the protruding direction of the first protruding portion 130A. The second surface 131A is a flat surface. The area of the first surface 139A is larger than the area of the second surface 131A. The second surface 131A is arranged at a position closer to the vehicle body of the vehicle 10A than the stack frame 300 of the high voltage system 100 (see FIGS. 7 and 8). In other words, the first protruding portion 130A protrudes further in the left-right direction of the vehicle 10A than the portion of the high voltage system 100 that is closest to the vehicle body.

Figure 10:
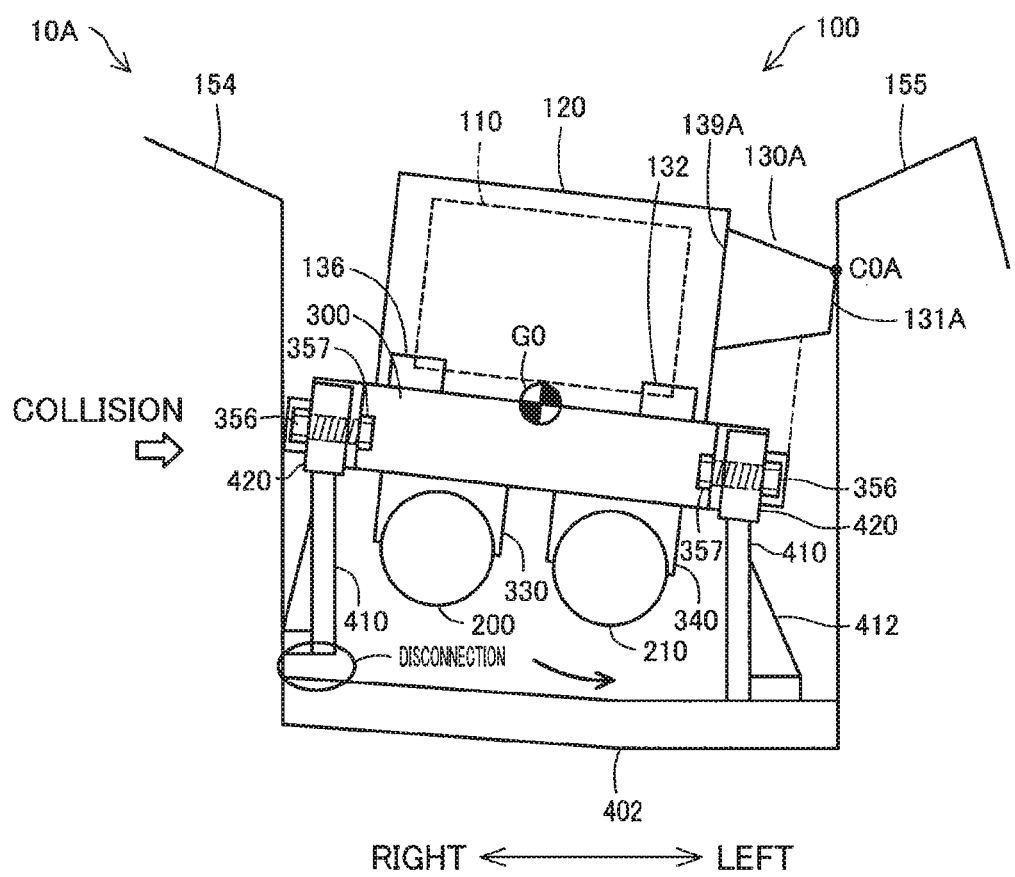
FIG. 10 is an explanatory view for conceptually explaining how the high voltage system operates when collision load is applied to the vehicle from the right.

FIG. 10 is an explanatory view for conceptually explaining how the high voltage system 100 operates when collision load is applied to the vehicle 10A from the right. In this embodiment, similar to the first embodiment, the first protruding portion 130A protrudes more toward the suspension tower 155 than the stack frame 300 of the high voltage system 100, and is arranged at a position higher than the center of gravity G0 of the high voltage system 100. Therefore, the lower portion (the side on which the accessories 200 and 210 are disposed) of the high voltage system 100 rotates in a direction that approaches the suspension tower 155, with the portion of the first protruding portion 130A that makes contact with the suspension tower 155 as a rotation center C0A. As a result, damage to the fuel cell stack 110 (specifically, the upper portion of the high voltage system 100) can be suppressed.

FIGS. 11A to 11C are explanatory views for illustrating the inside of the front compartment 20 as viewed from above when collision load is applied to the vehicle 10A from the front in a diagonally right direction. FIG. 11A illustrates a state before collision, and FIGS. 11B and 11C illustrate states after collision.

As indicated by the white arrow with a black border in FIG. 11B, when collision load is applied to the vehicle 10A from the front in a diagonally right direction, the high voltage system 100 moves from an original position indicated by the broken line so as to approach the suspension tower 155 on the left, and the first protruding portion 130A makes contact with the suspension tower 155. Then, the first protruding portion 130A becomes stuck in the suspension tower 155, and the high voltage system 100 moves further left (see FIG. 11C). The first protruding portion 130A according to this embodiment is formed into a substantially conical shape, and the area of a tip (the area of the second surface 131A) of the first protruding portion 130A in the protruding direction of the first protruding portion 130A is smaller than the area of the first surface 139A, which makes contact with the high voltage system 100. Therefore, when the first protruding portion 130A makes contact with the suspension tower 155 when collision load is input to the vehicle 10A, surface pressure on the second surface 131A of the first protruding portion 130A is larger than that on the first surface 139A. Therefore, load input to the suspension tower 155 via the first protruding portion 130A as a result of collision load being input to the vehicle 10A becomes larger than load input to the stack case 120 via the first protruding portion 130A in the same case. As a result, the suspension tower 155 breaks down earlier than the stack case 120. Due to the suspension tower 155 breaking down, the load input to the stack case 120 is reduced, and further damage to the fuel cell stack 110 is suppressed.

Third Embodiment

Figure 12:
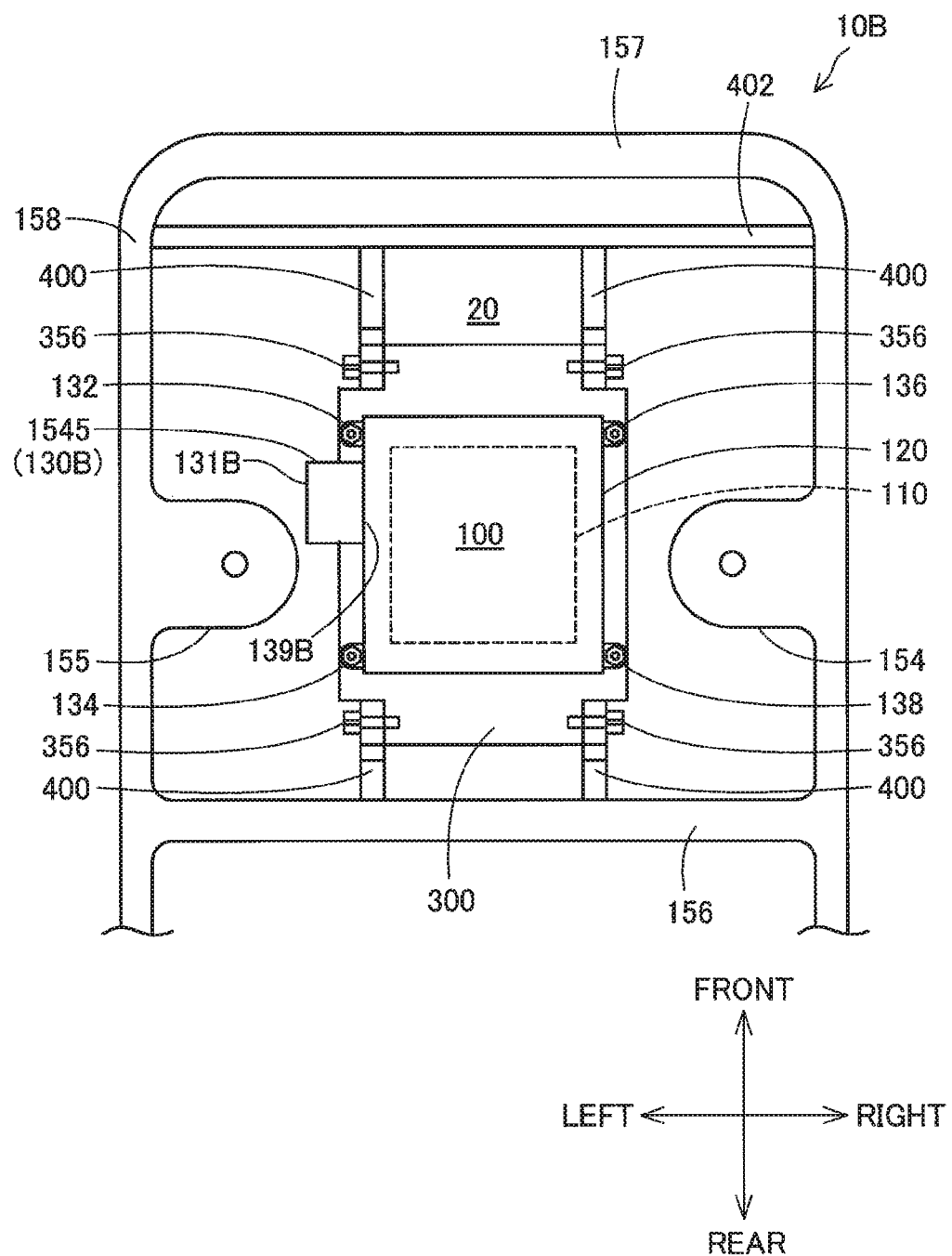
FIG. 12 is a plan view for illustrating the inside of a front compartment of a vehicle according to a third embodiment.
Figure 13:
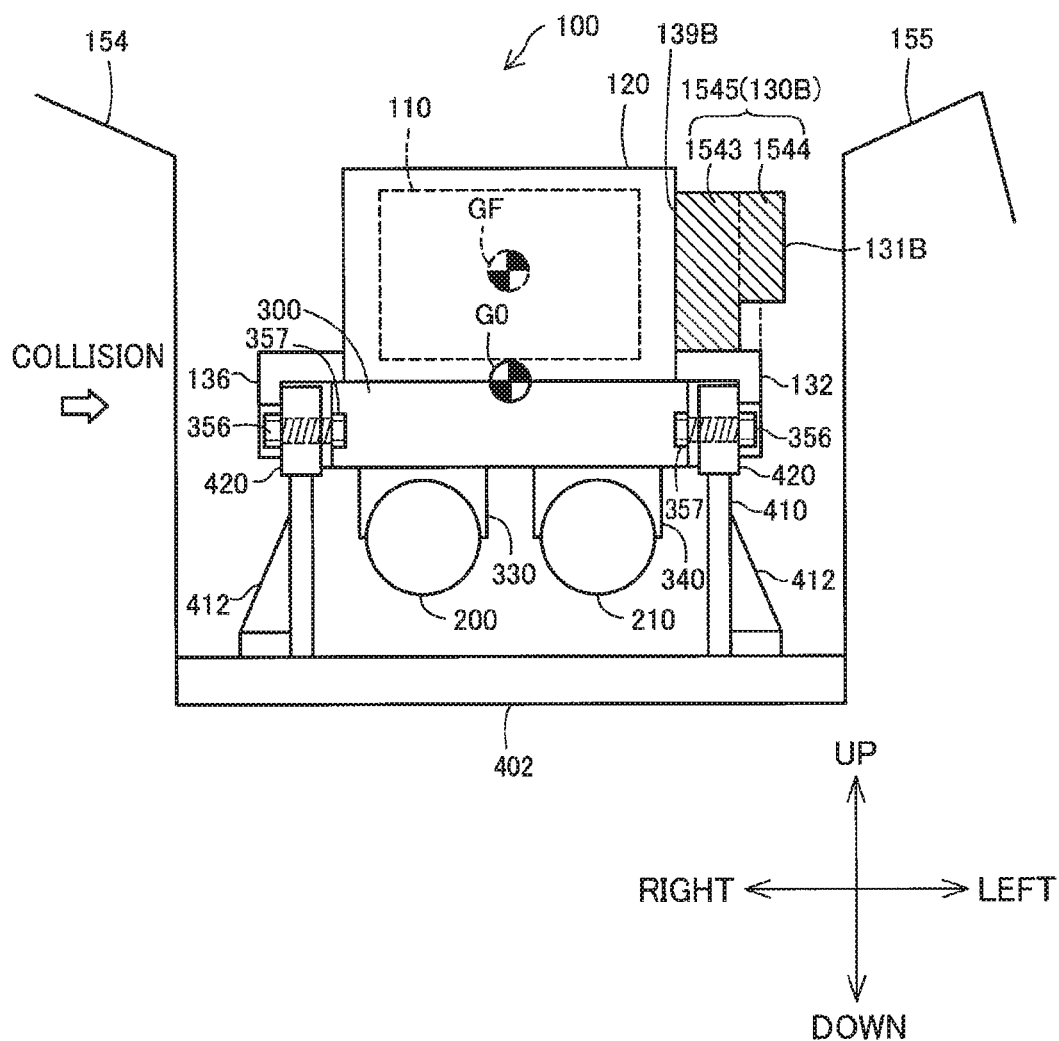
FIG. 13 is a front view for illustrating arrangement of the high voltage system, a rotary valve, and a bracket.

FIG. 12 is a plan view for schematically illustrating the inside of the front compartment 20 of a vehicle 10B according to a third embodiment. FIG. 13 is a front view for illustrating arrangement of the high voltage system 100, the rotary valve 1545, and the bracket 132. FIG. 14 is a side view for illustrating arrangement of the high voltage system 100, the rotary valve 1545, and the brackets 132 and 134. The vehicle 10B according to this embodiment is the same as the vehicle 10 according to the first embodiment except that the rotary valve 1545 is used as a first protruding portion 130B, and the brackets 132, 136, 134, and 138 that fix the stack case 120 to the stack frame 300 protrude toward the stack case 120 in the left-right direction of the vehicle 10. Other configurations of the vehicle 10B are the same as those in the first embodiment. Therefore, like configurations are denoted by like reference numbers, and the descriptions of those configurations are omitted herein. In FIG. 13, the first protruding portion 130B (rotary valve 1545) is indicated by diagonal hatching. In FIG. 14, a second surface 131B of the first protruding portion 130B, and the brackets 132 and 134 are indicated by diagonal hatching. Herein, the rotary valve 1545 is also referred to as "first protruding portion," the bracket 134 is also referred to as "second protruding portion," and the bracket 132 is also referred to as "third protruding portion." The entire bracket 134 according to this embodiment can be considered the "portion of the second protruding portion that most protrudes toward the vehicle body," and hence the bracket 134 is also referred to as "second most protruding portion." Likewise, the bracket 132 is also referred to as a "third most protruding portion."

As illustrated in FIG. 13, the rotary valve 1545 includes a gear unit 1543 that houses gears, and a valve unit 1544 that houses a valve. The valve unit 1544 includes a valve, and a casing that houses the valve and is formed into a substantially tubular shape with a bottom (see FIG. 13 and FIG. 14). The gear unit 1543 includes a gear, and a casing that houses the gear. The casing in the gear unit 1543 is formed into a shape such that a hollow cuboid extends over a lower side from a side surface of a substantially tubular shape with a bottom that has the same diameter as the casing in the valve unit 1544. The valve unit 1544 is arranged so as to overlap with a portion of the substantially tubular shape with a bottom of the gear unit 1543 on the left side of the gear unit 1543, and is formed integral with the gear unit 1543 (see FIG. 13). Here, "substantially tubular shape with a bottom" is a concept that includes tolerance and measurement errors. The casings of the gear unit 1543 and the valve unit 1544 are, for example, made of stainless steel. The casings of the gear unit 1543 and the valve unit 1544 can be made of any other material, and can be made of, for example, another metal such as aluminum or an aluminum alloy, or a resin such as a carbon fiber reinforced resin.

The first surface 139B (surface on the gear unit 1543 side) of the rotary valve 1545 (first protruding portion 130B) is joined to the left side surface of the stack case 120. Specifically, the second surface 131B (surface on the valve unit 1544 side) is a tip of the first protruding portion 130B in a protruding direction of the first protruding portion 130B. The second surface 131B is a flat surface. The area of the first surface 139B is larger than the area of the second surface 131B. The second surface 131B is arranged at a position closer to the vehicle body of the vehicle 10B than the stack frame 300 of the high voltage system 100 (see FIG. 13). In the rotary valve 1545, the valve unit 1544 most protrudes toward the vehicle body. Specifically, a position in the left-right direction (the position of the second surface 131B in the left-right direction) of a tip of the valve unit 1544 in the protruding direction of the rotary valve 1545 (that is, the first protruding portion 130B) is closer to the vehicle body than the position (the position of the stack frame 300 in the left-right direction) of the high voltage system 100 that is closest to the vehicle body in the left-right direction. The valve unit 1544 according to this embodiment is also referred to as "first most protruding portion."

The rotary valve 1545 is arranged such that the position of the entire valve unit 1544 (first most protruding portion) of the rotary valve 1545 (first protruding portion 130B) in the height direction becomes higher than the height of the center of gravity G0 of the high voltage system 100. In other words, in terms of the height direction, the position of the lowest point of the valve unit 1544 in the vertical direction is higher than the position of the center of gravity G0 of the high voltage system 100.

The brackets 132 and 134 are fixed to a surface formed by the rotary valve 1545 (first protruding portion 130B) of the stack case 120, and protrude in the left direction of the vehicle 10B (see FIGS. 12 and 13). Left edges (positions closest to the vehicle body in the left-right direction of the vehicle 10) of the brackets 132 and 134 coincide with the outer edge of the stack frame 300 (see FIGS. 12 and 13).

In addition, when the vehicle 10B is placed on a horizontal plane, the brackets 132 and 134 are located below the rotary valve 1545. In this embodiment, the brackets 132 and 134 are formed integral with the stack case 120.

As illustrated in FIG. 14, assuming that a virtual line that passes through a center C1 of the valve unit 1544 (first most protruding portion) of the rotary valve 1545, and a center C2 of the bracket 134 is a virtual line L, when the vehicle 10B is placed on a horizontal plane and viewed from the left-right direction of the vehicle 10B, the center of gravity G0 of the high voltage system 100 is lower than the virtual line L. In addition, when the vehicle 10B is placed on a horizontal plane, the bracket 132 is lower than the virtual line L.

Figure 16:
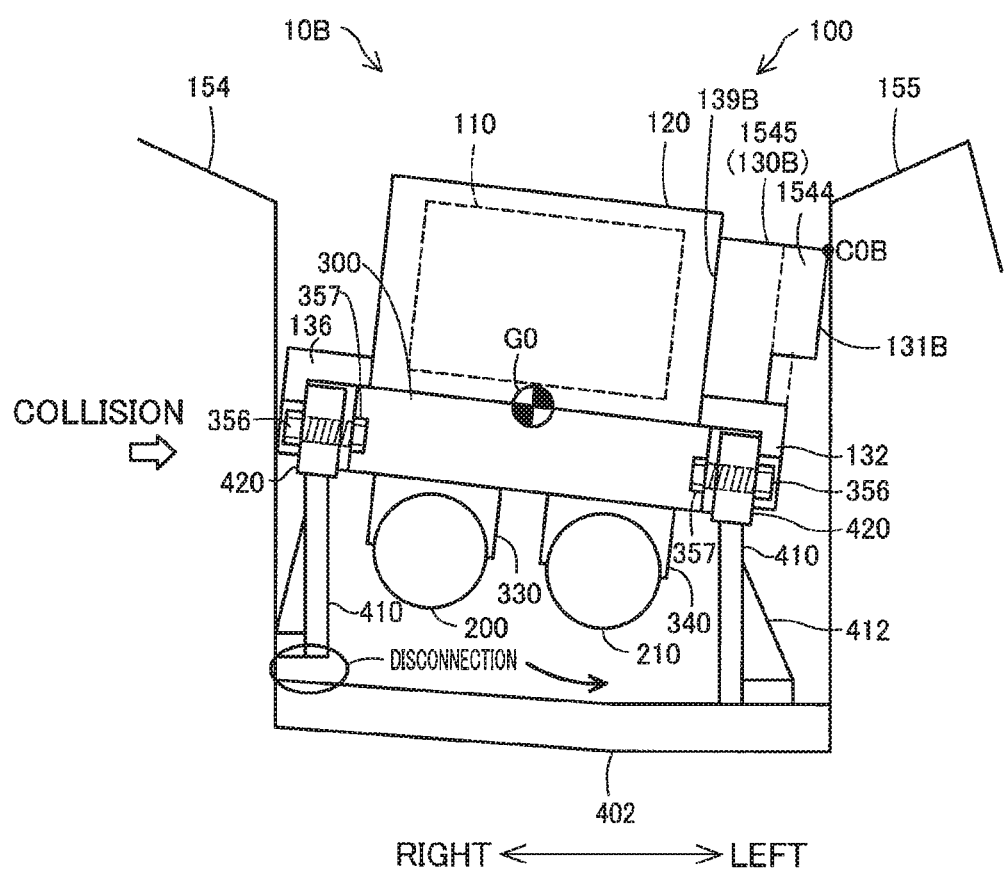
FIG. 16 is an explanatory view for illustrating the inside of the front compartment illustrated in FIG. 15B, as seen from the front.

FIGS. 15A to 15C are explanatory diagrams for illustrating the inside of the front compartment 20 as viewed from above when collision load is applied to the vehicle 10B from the front in a diagonally right direction. FIG. 15A illustrates a state before collision, and FIGS. 15B and 15C illustrate states after collision. FIG. 16 is an explanatory view for illustrating the inside of the front compartment 20 illustrated in FIG. 15B, as seen from the front. FIG. 17 is an explanatory view for illustrating the inside of the front compartment 20 illustrated in FIG. 15B, as seen from the side.

As illustrated by the white arrow with a black border in FIG. 15B, when collision load is applied to the vehicle 10B from the front in a diagonally right direction, the high voltage system 100 moves from an original position indicated by the broken like so as to approach the suspension tower 155 on the left, and the first protruding portion 130B (that is, the rotary valve 1545 side) makes contact with the suspension tower 155. Then, the first protruding portion 130A becomes stuck in the suspension tower 155, and the high voltage system 100 moves further to the left (see FIG. 15C). The area of the second surface 131B (that is, a surface on the valve unit 1544 side), which is a tip of the first protruding portion 130B according to this embodiment in the protruding direction of the first protruding portion 130B, is smaller than the area of the first surface 139B (that is, the surface on the gear unit 1543) that makes contact with the high voltage system 100. Therefore, when the first protruding portion 130B makes contact with the suspension tower 155 due to collision load being input to the vehicle 10B, surface pressure on the second surface 131B is greater than surface pressure on the first surface 139B. Therefore, load input to the suspension tower 155 via the first protruding portion 130B due to input of collision load to the vehicle 10B becomes greater than load input to the stack case 120 via the first protruding portion 130B. As a result, the suspension tower 155 breaks down earlier than the stack case 120. Due to the suspension tower 155 breaking down, the load input to the stack case 120 is reduced, and the fuel cell stack 110 is suppressed from being damaged.

As described above, when the first protruding portion 130B (that is, the rotary valve 1545) makes contact with the suspension tower 155, the valve unit 1544 of the rotary valve 1545 becomes stuck in the suspension tower 155, and the high voltage system 100 moves further left. At this time, as described in the first embodiment, the lower portion (that is, the accessories 200 and 210 side) of the high voltage system 100 rotates so as to approach the suspension tower 155, with a point of connection between the second surface 131B and the suspension tower 155 as a rotation center COB (see FIG. 16). When the valve unit 1544 of the rotary valve 1545 becomes stuck in the suspension tower 155, and the high voltage system 100 moves further left, the bracket 134 makes contact with the suspension tower 155. Here, when the vehicle 10B is placed on a horizontal plane, the brackets 132 and 134 are located at approximately the same height (see FIG. 14), and, when the high voltage system 100 moves further left, at least one of the brackets 132 and 134 makes contact with the suspension tower 155. The reason for at least one of the brackets 132 and 134 making contact with the suspension tower 155 is that the rotation center of the high voltage system 100 is a point, and hence no rotation axis is determined. In this embodiment, it is assumed that the bracket 134 has made contact with the suspension tower 155 directly after the first protruding portion 130B. When the first protruding portion 130B becomes stuck in the suspension tower 155, and the high voltage system 100 rotates to cause the bracket 134 to make contact with the suspension tower 155, a lower side (that is, the accessories 200 and 210 side) of the high voltage system 100 rotates so as to approach the suspension tower 155, with the above-mentioned virtual line L as a rotation axis (rotation direction is indicated in FIG. 17 by an arrow). Therefore, compared to a case in which the bracket 132 is configured so as to protrude from the stack case 120 toward the rear of the vehicle (first and second embodiments), the rotation axis of the high voltage system 100 is determined, and therefore damage to the fuel cell stack 110 can be more stably suppressed.

In addition, because the bracket 132 is arranged below the virtual line L, when the lower side of the high voltage system 100 rotates so as to approach the suspension tower 155 with the virtual line L as a rotation axis, the bracket 132 subsequently makes contact with the suspension tower 155. When this happens, compared to a case in which the bracket 132 is configured so as to protrude from the stack case 120 toward the front of the vehicle (first and second embodiments), the accessories 200 and 210 are less likely to collide with the suspension tower 155, and collision load applied to the suspension tower 155 when the accessories 200 and 210 collide with the suspension tower 155 is reduced.

In addition, in this embodiment, because the rotary valve 1545 is used as the first protruding portion 130B, as in the first and second embodiments, the number of components needed to suppress damage to the fuel cell stack 110 can be kept to a minimum, compared to a case in which components are provided individually. Further, in the rotary valve 1545 according to this embodiment, because the respective areas of the first surface 139B on the gear unit 1543 side and the second surface 131B on the valve unit 1544 side are different from each other, the surface with the larger area (first surface 139B) is arranged so as to make contact with the stack case 120. Therefore, input to the fuel cell stack 110 as a result of the vehicle 10B being involved in a collision can be easily suppressed.

Fourth Embodiment

FIG. 18 is a plan view for schematically illustrating the inside of the front compartment 20 of a vehicle 10C according to a fourth embodiment. In this embodiment, the rotary valve 1545 is fixed to the left side of the stack case 120, and the refrigerant pump 1570 (see FIG. 2) is disposed on the right side of the stack case 120. The refrigerant pump 1570 is disposed at a position that is higher than the center of gravity of the high voltage system 100. The rotary valve 1545 and the refrigerant pump 1570 according to this embodiment are also referred to as "first protruding portion," respectively. With this configuration, even when collision load is input from the left side of the vehicle 10C, damage to the fuel cell stack 110, which is arranged on the top side of the high voltage system 100, can be suppressed, similar to a case in which collision load is input from the right side of the vehicle 10C.

In addition, the radiator 1530 and the radiator fan 1535 (FIG. 2) are arranged at the front of the stack case 120. In this embodiment, because a back surface (surface on a rear side of the vehicle 10C) of the fuel cell stack 110, which is a heat source, and the radiator 1530 that is provided at the front of the fuel cell stack 110 are connected to each other, and the rotary valve 1545 and the refrigerant pump 1570 provided on a refrigerant path are fixed to a side surface of the stack case 120, the refrigerant path can be shortened.

Modification Example (1) In the above-mentioned embodiments, the high voltage system 100 is exemplified as including the fuel cell stack 110 and the accessories 200 and 210, but the high voltage system 100 is not limited to this configuration, and may include at least the fuel cell stack 110. Alternatively, in addition to the fuel cell stack 110, the high voltage system 100 may include another high voltage component, for example, the DC/DC converter 500 (also referred to as "FDC") for the fuel cell stack 110, or an inverter.

(2) In the above-mentioned embodiments, in the high voltage system 100, it is described that the fuel cell stack 110 is arranged such that the position of the center of gravity GF of the fuel cell stack 110 in the height direction is higher than the center of gravity G0 of the high voltage system 100, but the position of the center of gravity GF of the fuel cell stack 110 in the height direction may be lower than the center of gravity G0 of the high voltage system 100. For example, in the high voltage system 100 according to the above-mentioned first embodiment, if the DC/DC converter 500 and a converter case (not shown) are placed on top of the stack case 120, the position of the center of gravity GF of the fuel cell stack 110 in the height direction sometimes becomes lowers than the center of gravity G0 of the high voltage system 100. In this case, damage to the upper portion of the high voltage system 100 (DC/DC converter 500) is suppressed by providing the first protruding portion 130.

(3) In the above-mentioned embodiments, the first protruding portions 130, 130A, and 130B are described as being fixed to the stack case 120, but the first protruding portions 130, 130A, and 130B are not limited to this. The first protruding portions 130, 130A, and 130B may be fixed to the high voltage system 100 and protrude in the left-right direction of the vehicle 10, and the height of those protruding portions in the height direction may be the same as or higher than the center of gravity of the high voltage system 100. For example, when the DC/DC converter 500 is disposed on an upper portion of the fuel cell stack 110 and the DC/DC converter 500 is housed in a case, there may be adopted a configuration in which the first protruding portions 130, 130A, and 130B are fixed to the case that houses the DC/DC converter 500. Even with this configuration, damage to the upper side of the high voltage system 100 can be suppressed. Even in this case, if the fuel cell stack 110 is arranged such that the height of the fuel cell stack 110 in the height direction is higher than the center of gravity of the high voltage system 100, damage to the fuel cell can be suppressed.

(4) In the above-mentioned embodiments, it is described that, when the vehicle 10 is placed on a horizontal plane, the position of the first most protruding portion, which protrudes most toward the vehicle body in the first protruding portion 130, in the height direction is higher than the center of gravity of the high voltage system 100, but the position of the first most protruding portion, which protrudes most toward the vehicle body in the first protruding portion 130, in the height direction may be the same as the center of gravity of the high voltage system 100. "The position of the first most protruding portion, which protrudes most toward the vehicle body in the first protruding portion 130, in the height direction is the same as the center of gravity of the high voltage system 100" means that the lowest point of the first most protruding portion in the height direction (vertical direction) coincides with the position of the center of gravity of the high voltage system 100 in the height direction. When the position of the first most protruding portion in the height direction is the same as the center of gravity of the high voltage system 100, it is more likely that the high voltage system 100 will not rotate, and hence damage to the fuel cell stack 110 is suppressed.

(5) In the above-mentioned second and third embodiments, it is described that the first surfaces 139A and 139B and the second surfaces 131A and 131B of the first protruding portions 130A and 130B are flat surfaces, and that the areas of the first surfaces 139A and 139B are larger than those of the second surfaces 131A and 131B. However, those surfaces are not limited to that configuration. There may be adopted such a configuration that, when the first protruding portion makes contact with vehicle body components that are disposed in the left-right direction of the vehicle, the vehicle body components deform earlier than the high voltage system. For example, in the first protruding portion 130 according to the above-mentioned first embodiment, the second surface 131 may be formed into an uneven shape. In addition, the first protruding portion may be formed into a shape that is more difficult to damage than the vehicle body components when collision load is applied.

(6) The vehicle may include at least the first protruding portion. In the above-mentioned third embodiment, a configuration may be adopted in which the third protruding portion is not included.

(7) In the above-mentioned third embodiment, the bracket 134 is described as an example of the second protruding portion, and the bracket 132 is described as an example of the third protruding portion, but the second protruding portion and the third protruding are not limited to the above-mentioned embodiment. The second protruding portion and the third protruding portion may be provided separately to the brackets 132 and 134. However, when brackets are used as the second protruding portion and the third protruding portion, damage to the high voltage system can be suppressed without needing to increase the number of components needed, unlike a case in which separate components are provided as the second protruding portion and the third protruding portion.

In addition, in the above-mentioned embodiments, the brackets 132 and 134 are described as having a shape that protrudes substantially parallel from the stack case 120 as an example, but this shape may be freely changed. For example, the shape may be a shape that bends into an L-shape. When L-shaped brackets make contact with the stack case 120 and become fixed to the stack case 120, the portions that protrude substantially parallel correspond to the second most protruding portion and the third most protruding portion.

(8) In the above-mentioned third embodiment, it is described that the rotary valve 1545 as the first protruding portion 130B, the bracket 134 as the second protruding portion, and the bracket 132 as the third protruding portion are fixed to the stack case 120, but the described configuration is not limited thereto. For example, all of the first protruding portion, the second protruding portion, and the third protruding portion may be fixed to a component other than the stack case 120, or the first protruding portion may be fixed to the stack case 120, and the second and third protruding portions may be fixed to a component other than the stack case 120, or the first and second protruding portions may be fixed to the stack case 120, and the third protruding portion may be fixed to a component other than the stack case 120.

(9) In the above-mentioned third embodiment, it is described that the left ends of the bracket 134 as the second protruding portion and the bracket 132 as the third protruding portion coincide with the outer edge of the stack frame 300, but the described configuration is not limited thereto, and the second and third protruding portions may be configured to protrude from the high voltage system 100. However, when the second and third protruding portions protrude further than the portion of the vehicle 10 closest to the vehicle body in the left-right direction in the high voltage system 100, there is a high chance that the second and third protruding portions will make contact with the vehicle body earlier than the high voltage system 100 when the high voltage system 100 rotates with the point of connection between the first protruding portion 130 and the vehicle body as a rotation center, and hence this configuration is preferable.

(10) In the above-mentioned third embodiment, it is described that the first protruding portion is the rotary valve 1545, but the first protruding portion is not limited to this configuration. For example, an anode gas pump, a refrigerant pump for air conditioning a vehicle, or a valve for air conditioning a vehicle may be used as the first protruding portion.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the technology disclosed in this specification, there is provided a vehicle. The vehicle includes a high voltage system disposed in a front compartment of the vehicle and including a fuel cell, and a first protruding portion that is fixed to the high voltage system, and protrudes toward a vehicle body of the vehicle further than a portion of the high voltage system that is closest to the vehicle body, in which, when the vehicle is placed on a horizontal plane, the first protruding portion is arranged such that a position of a first most-protruded portion of the first protruding portion is located at the same position or higher than a center of gravity of the high voltage system in a height direction. The first most-protruded portion is a portion protruding most toward the vehicle body in the first protruding portion.

According to this aspect, when the high voltage system moves in a left-right direction (including a diagonal direction), which is also a direction in which the first protruding portion approaches the vehicle body, relative to the vehicle body due to the vehicle being involved in a collision, the first protruding portion protrudes more toward the vehicle body than the high voltage system. Therefore, there is a high chance that the first protruding portion will make contact with the vehicle body first during a collision. More specifically, there is a high chance that the first most protruding portion (includes a case in which the first protruding portion matches the first most protruded portion), which is the part of the first protruding portion that protrudes most toward the vehicle body, will make contact with the vehicle body first. Because the first protruding portion is arranged such that the first most protruding portion is located at the same position or higher than the center of gravity of the high voltage system in the height direction, when the first protruding portion makes contact with the vehicle body, a lower portion of the high voltage system rotates in a direction that approaches a side surface of the vehicle body, with the portion (first most protruding portion) of the first protruding portion that makes contact with the vehicle body as a rotation center. Therefore, damage to the upper portion of the high voltage system is suppressed that is caused by the contact with the side surface of the vehicle body.

(2) In the vehicle according to the above-described aspect, the fuel cell may be arranged such that, in the height direction, when the vehicle is placed on a horizontal plane, the position of center of gravity of the fuel cell becomes higher than the position of center of gravity of the high voltage system. With this configuration, devices and components become arranged below the fuel cell. As a result, the first protruding portion makes contact with the vehicle body, and there is a higher chance that the devices and components that are disposed below the fuel cell will make contact with the side surface of the vehicle body when the lower portion of the high voltage system rotates in the direction that approaches the side surface of the vehicle body, with the portion (first most protruding portion) of the first protruding portion that makes contact with the vehicle body as a rotational center. Therefore, damage to the fuel cell is suppressed as a result of coming into contact with the side surface of the vehicle body.

(3) In the vehicle according to the above-described aspect, the first protruding portion may be arranged such that, when the first protruding portion makes contact with a vehicle body component that is disposed in the left-right direction of the vehicle, the vehicle body component deforms earlier than the high voltage system. With this configuration, because the vehicle body component, for example, a suspension tower deforms earlier than the high voltage system, damage to the high voltage system can be suppressed.

(4) In the vehicle according to the above-described aspect, an area of a first surface of the first protruding portion that makes contact with the high voltage system may be larger than an area of a second surface of a tip end of the first protruding portion in a protruding direction of the first protruding portion. With this configuration, when the first protruding portion makes contact with the vehicle body, the surface pressure on the vehicle body side becomes larger than that on the high voltage system side, and hence, when the vehicle is involved in a collision, the component on the vehicle body side becomes damaged first, to thereby reduce input to the high voltage system. As a result, damage to the high voltage system is suppressed.

(5) In the vehicle according to the above-described aspect, the first protruding portion may be a rotary valve that is used to supply refrigerant to the fuel cell. By using a rotary valve that is used to supply refrigerant to the fuel cell as the first protruding portion, compared to a case in which the first protruding portion is provided separately in order to suppress damage to the upper portion of the high voltage system, damage to the high voltage system can be suppressed without increasing the number of components used.

(6) In the vehicle according to the above-described aspect, the vehicle further includes a second protruding portion fixed to the high voltage system on the same side as the first protruding portion in the left-right direction, being located below the first protruding portion when the vehicle is placed on a horizontal plane, and protruding toward the vehicle body, in which the first protruding portion and the second protruding portion may be arranged such that, when the vehicle is placed on a horizontal plane and viewed in the left-right direction, the center of gravity of the high voltage system is below a virtual line that passes through a center of the first most protruding portion of the first protruding portion and the center of a second most protruding portion of the second protruding portion that protrudes most toward the vehicle body. With this configuration, when the high voltage system moves in a left-right direction (includes diagonal directions) relative to the vehicle body, and the first protruding portion side collides with the vehicle body to rotate the high voltage system due to the vehicle being involved in a collision, the high voltage system rotates, with a virtual line that connects the portion (first most protruding portion) of the first protruding portion that makes contact with the vehicle body, and the portion of the second protruding portion that makes contact with the vehicle body (second most protruding portion) with each other as a rotational axis. Therefore, it is easy to predict the rotation of the high voltage system when the vehicle is involved in a collision, and the first protruding portion and the second protruding portion can be appropriately disposed with consideration to the positional relationship between the high voltage system and the other parts in the front compartment of the vehicle, or other factors. As a result, damage to the upper portion of the high voltage system can be more appropriately suppressed.

(7) In the vehicle according to the above-described aspect, the vehicle further includes a third protruding portion fixed to the high voltage system on the same side as the first protruding portion in the left-right direction, protruding toward the vehicle body, in which the third protruding portion may be arranged such that a third most protruding portion of the third protruding portion that protrudes most toward the vehicle body is located below the virtual line when the vehicle is placed on a horizontal plane. With this configuration, because the third protruding portion makes contact with the vehicle body before the lower portion of the high voltage system makes contact with the vehicle body when the high voltage system rotates with the virtual line as a rotation axis as a result of the vehicle being involved in a collision, input to the lower portion of the high voltage system is mitigated, and damage to the lower portion of the high voltage system is suppressed.

(8) In the vehicle according to the above-described aspect, the high voltage system includes an accessory for the fuel cell, in which the accessory may be arranged below the fuel cell when the vehicle is placed on a horizontal plane. With this configuration, the fuel cell in the high voltage system is arranged above the accessory, and the accessory approaches the vehicle body when the high voltage system rotates about a point of connection between the first protruding portion and the vehicle body. Therefore, damage to the fuel cell can be suppressed.

The present disclosure can be implemented in the form of various embodiments, for example, a installation method for a fuel cell.

What is claimed is:

1. A vehicle comprising:
 a high voltage system disposed in a front compartment of the vehicle, the high voltage system including a fuel cell; and
 a first protruding portion that is fixed to the high voltage system and that protrudes in a left-right direction of the vehicle toward a vehicle body of the vehicle further than a portion of the high voltage system that is closest to the vehicle body, wherein
 the first protruding portion includes a protruded segment that is a portion of the first protruding portion situated in closest proximity to the vehicle body in the left-right direction,
 when the vehicle is placed on a horizontal plane, the protruded segment of the first protruding portion is located at the same position or higher than a center of gravity of the high voltage system in a height direction of the vehicle, and
 the protruded segment of the first protruding portion is configured to be spaced apart from the vehicle body;
 wherein the high voltage system additionally includes a stack case that houses the fuel cell, the first protruding portion being fixed to the stack case, and
 when the vehicle is placed on the horizontal plane, a center of gravity of the fuel cell is located above the center of gravity of the high voltage system in the height direction.

2. The vehicle in accordance with claim 1, wherein when the first protruding portion makes contact with a vehicle body component that is disposed in the left-right direction of the vehicle, the first protruding portion is configured to exert greater surface pressure on the vehicle body component than on the high voltage system.

3. The vehicle in accordance with claim 2, wherein the first protruding portion comprises:
 a first surface that makes contact with the high voltage system; and
 a second surface formed on an opposite end of the first protruding portion from the first surface,
 wherein an area of the first surface is larger than an area of the second surface.

4. The vehicle in accordance with claim 1, wherein the first protruding portion is a rotary valve configured to supply refrigerant to the fuel cell.

5. The vehicle in accordance with claim 1, wherein:
 the vehicle further comprises a second protruding portion fixed to the high voltage system on the same side as the first protruding portion in the left-right direction, the second protruding portion being located below the first protruding portion when the vehicle is placed on the horizontal plane, the second protruding portion protruding toward the vehicle body;
 the second protruding portion includes a protruded segment that is a portion of the second protruding portion situated in closest proximity to the vehicle body in the left-right direction; and
 when the vehicle is placed on the horizontal plane and viewed in the left-right direction, the center of gravity of the high voltage system is located below a virtual line that passes through a center of the protruded segment of the first protruding portion and a center of the protruded segment of the second protruding portion.

6. The vehicle in accordance with claim 5, wherein:
 the vehicle further comprises a third protruding portion fixed to the high voltage system on the same side as the first protruding portion in the left-right direction, the third protruding portion protruding toward the vehicle body;
 the third protruding portion includes a protruded segment that is a portion of the third protruding portion situated in closest proximity to the vehicle body in the left-right direction; and
 the protruded segment of the third protruding portion is located below the virtual line when the vehicle is placed on the horizontal plane.

7. The vehicle in accordance with claim 6, wherein the high voltage system comprises an accessory for the fuel cell, the accessory being located below the fuel cell when the vehicle is placed on the horizontal plane.

* * * * *